United States Patent [19]

Cochran et al.

[11] 4,020,465
[45] Apr. 26, 1977

[54] THERMAL LINE PRINTER

[75] Inventors: Michael J. Cochran, Richardson; Stephen P. Hamilton, Garland, both of Tex.

[73] Assignee: Texas Instruments Incorporated, Dallas, Tex.

[22] Filed: Dec. 26, 1973

[21] Appl. No.: 428,492

[52] U.S. Cl. .......................... 340/172.5; 178/23 R
[51] Int. Cl.² .................... G06F 3/12; H04L 15/24
[58] Field of Search ................. 340/172.5; 178/23; 445/1

[56] References Cited

UNITED STATES PATENTS

| | | | |
|---|---|---|---|
| 3,354,817 | 11/1967 | Sakurai et al. | 178/23 R |
| 3,476,877 | 11/1969 | Perkins et al. | 178/23 R |
| 3,634,828 | 1/1972 | Myers et al. | 340/172.5 |

Primary Examiner—Malcolm A. Morrison
Assistant Examiner—Errol A. Krass
Attorney, Agent, or Firm—Harold Levine; Rene E. Grossman; Richard P. Berg

[57] ABSTRACT

A thermal line printer includes a semiconductor chip for control of A × N heaters arrayed in N groups past which thermally sensitive paper is stepped B times in printing a line of characters in an A × B dot matrix. A sequential access memory stores N multibit words, one word for each character to be printed on a given line with a commutator cyclically to read words from the memory A × B times for each line to be printed. A ROM has an A × B dot matrix code therein for each available character. A time sequencer and decoder connected to the ROM is synchronized with the commutator to produce a different one bit output from the ROM each time each given word is read from memory. A set of N enable circuits leads from the ROM to N groups of heaters. A set of A enable circuits leads from the sequencer to A groups of heaters where one heater in each A group is from one of the N groups. A decoder interfaces the sequencer to the A groups of heaters and to the motor sequentially to enable the heaters in one A group for each memory cycle and in order through the A columns and B rows of the matrix.

10 Claims, 17 Drawing Figures

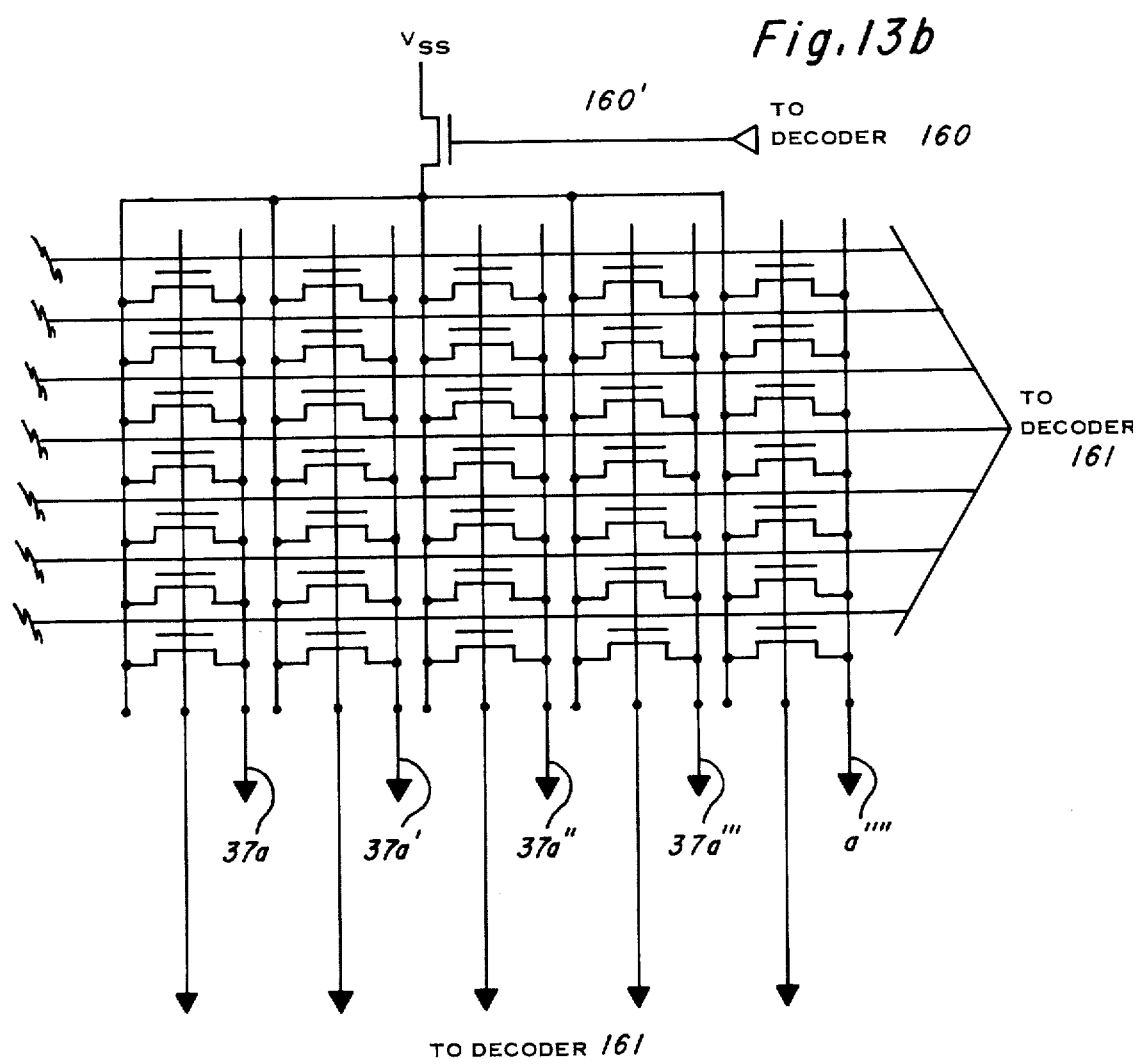

THERMAL LINE PRINTER

This invention relates to a thermal printing of a calculator output, and more particularly to a thermal printer having control circuits implemented on a semiconductor chip which receives from other calculator chips function and data signals to be printed along with control signals to synchronize printing with operation of the calculator.

Electronic desk top calculators and compact handheld calculators are now readily available at low cost primarily because of advances in semiconductor technology. Availability of MOS/LSI chips has permitted the development of desk and hand calculators of capabilities far beyond those of the previous calculator generations.

In U.S. Pat. No. 3,984,816, a two chip calculator is disclosed in detail wherein there is provided a numeric display of the calculator results and functions. A one chip calculator is described in detail in copending application "Variable Function Programmed Calculator", Ser. No. 163,565, filed July 19, 1971, by M. J. Cochran et al now abandoned in favor of continuation application Ser. No. 420,999, filed Dec. 3, 1973. Such calculators are currently manufactured and sold by Texas Instruments Incorporated of Dallas, Texas, and identified as TMS 200–300 Series.

The present invention relates to a printer including an auxiliary MOS/LSI chip which utilizes function and data signals from units such as embodied in the above-identified Texas Instruments calculators, along with control and timing signals to control a thermal printer. Thermally sensitive paper stepped past a printhead in coordination with the operation of the chip provides printout of the calculator results rather than or in addition to a mere display thereof.

A thermal printer system of the type utilizing strobed thermal printhead elements is set forth in U.S. Pat. No. 3,476,877. Such printer, however, features a clocking arrangement requiring external clock signals, and requires new data to be input for every line of dots output, thereby requiring several data inputs to the system per printed line of complete characters. Furthermore, the data input must be in a decoded format which directly actuate the respective dots in the output.

It is therefore an object of the present invention to provide a printing system utilizing storage means for storing character codes, especially in a calculator system. It is another object to provide a printing system for outputting an N character line, each character generated by actuation of an A × B matrix in accordance with codes s selected from a character storage memory. It is another object to provide such a printing system which is responsive to serial data input which is selectively decoded and stored in a memory for addressing the character storage memory.

It is another object to provide such a printing system which decodes only serial data representing function print commands and storing a plurality of codes in response to a function command, while directly storing character print commands. It is still yet another object to provide such a printing system which drives a thermal printhead output printer having like positioned dots in each group of the N × A row actuated simultaneously and then the sequence of like dots in the groups strobed in accordance with output from the character storage memory.

In accordance with the present invention, a printer MOS/LSI chip is operated to generate its own internal commands and clock signal. A serial data stream and a print command in combination with a character storing memory are utilized for the selective energization of semiconductor heaters disposed in a linear array.

More particularly, a semiconductor printer control chip is provided for a thermal line printer where A × N heaters are provided in a linear array of N groups and past which thermally sensitive paper is stepped by a motor B times in printing a line of characters in an A × B dot matrix. A sequential access memory stores N multibit words, one word for each character to be printed on a given line. A commutator cyclically reads words from memory A × B times for each character to be printed. A random access ROM stores an A × B dot matrix code for each available character. A time sequencer and decoder is connected to the ROM and synchronized with the commutator to produce a different one bit output from the ROM each time each given word is read from memory. A set of N enable circuits lead from the ROM to N groups of heaters. A set of A enable circuits lead from the sequencer to A groups of heaters where one heater in each A group is from one of the N groups. A decoder interfaces the time sequentially to enable the heaters in one A group for each memory cycle and in order through the A columns and B rows of the matrix.

In a further aspect, an N character line of alphanumeric characters is selected from an available repertoire of magnitude greater than N and is represented by a data stream coded to represent characters to be printed. The data stream of N words is stored on a semiconductor chip. A set of timing signals is generated and synchronized with storage of the N words. The stored words are transformed into B sets of bits each comprising N subsets of elements of N (A × B) dot matrix codes representing the N characters. Members of an A × N linear array of heaters in the printer are energized upon formation of each B set of the subset elements and in response to subset elements. Thermally sensitive paper is stepped past the printhead following each B set energization of the printhead.

The novel features believed characteristic of the invention are set forth in the appended claims. Or the invention itself, however, as well as further objects and advantages thereof, will best be understood by reference to the following detailed description of an illustrative embodiment taken in conjunction with the accompanying drawings, wherein:

Figure 1:
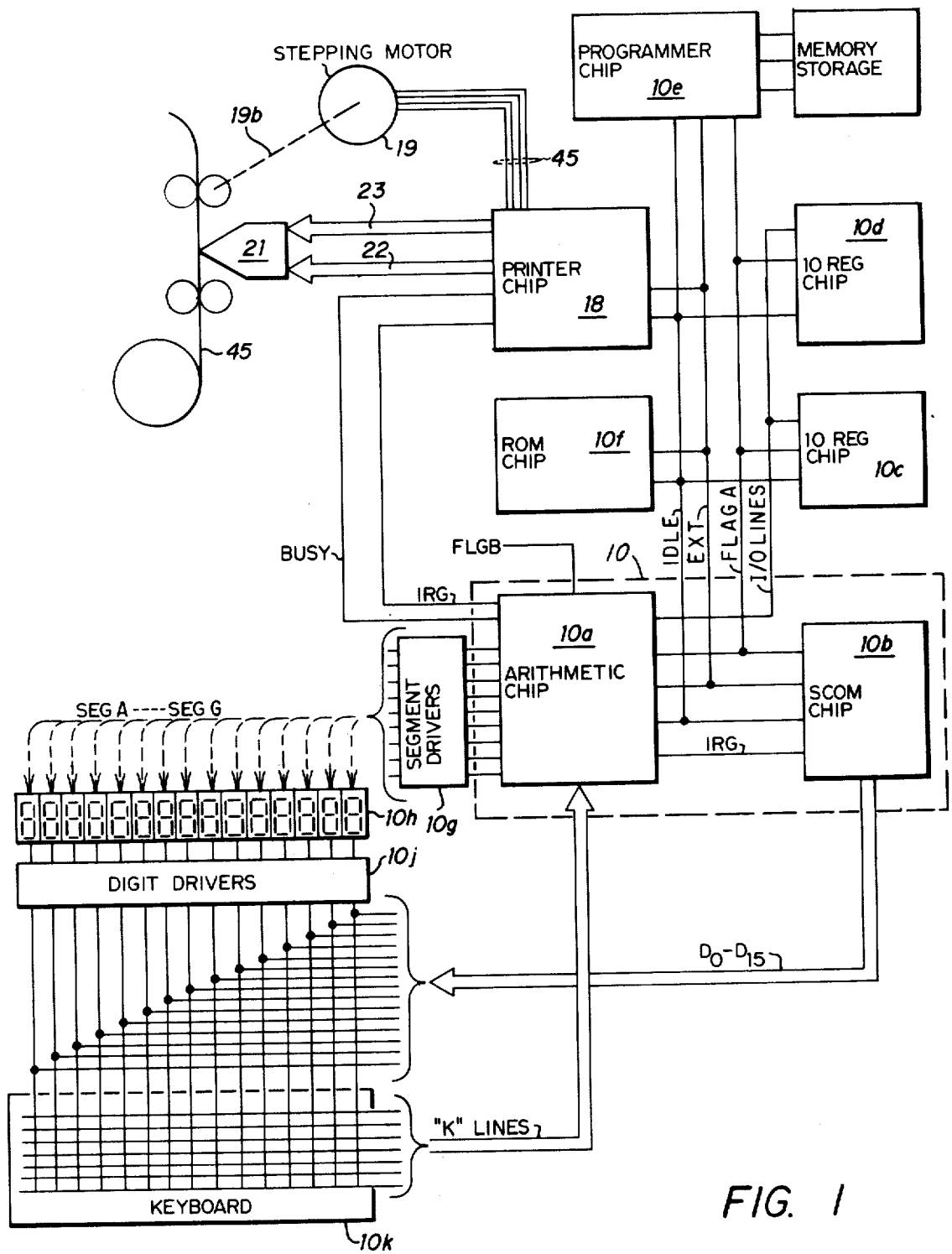
FIG. 1 is a simplified block diagram of a calculator system illustrating application of one aspect of the invention.
Figure 3:
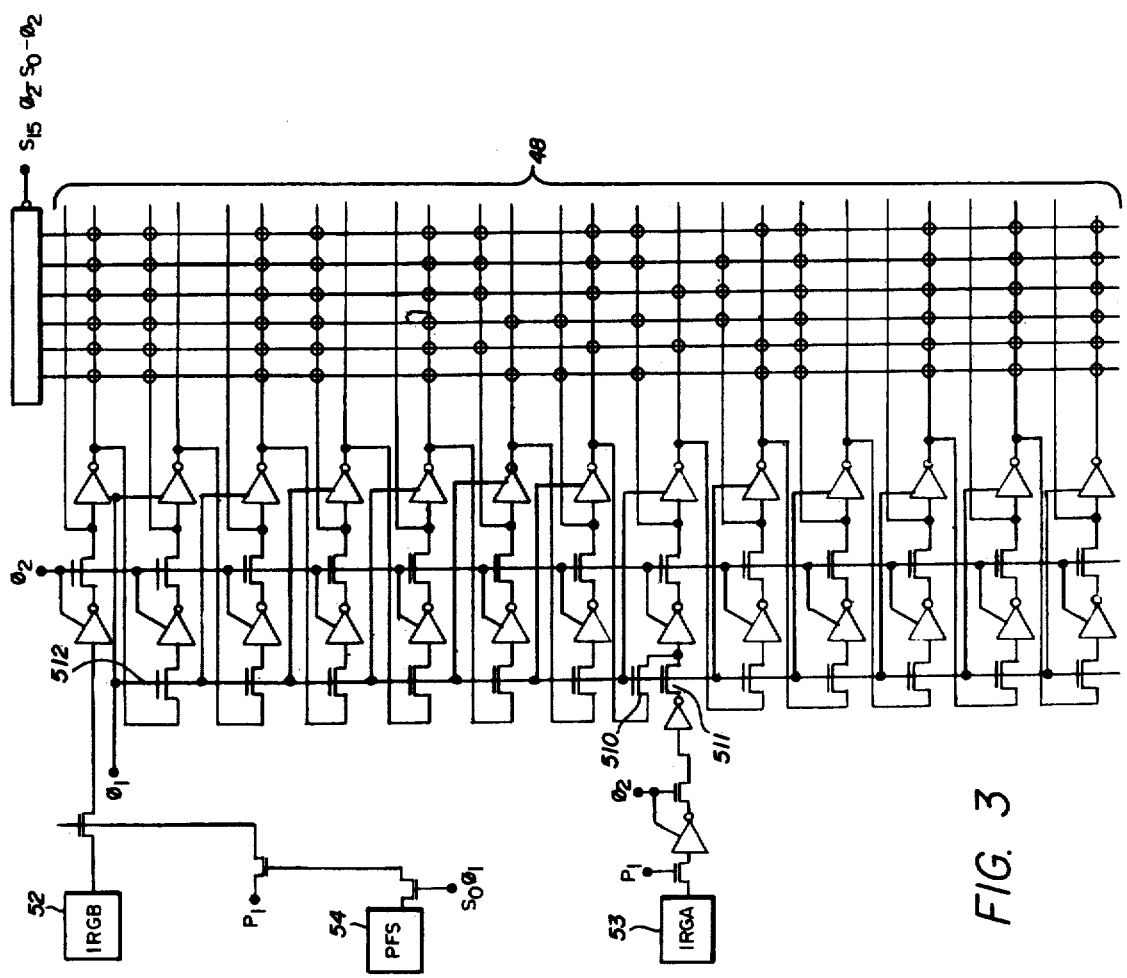
Figure 4:
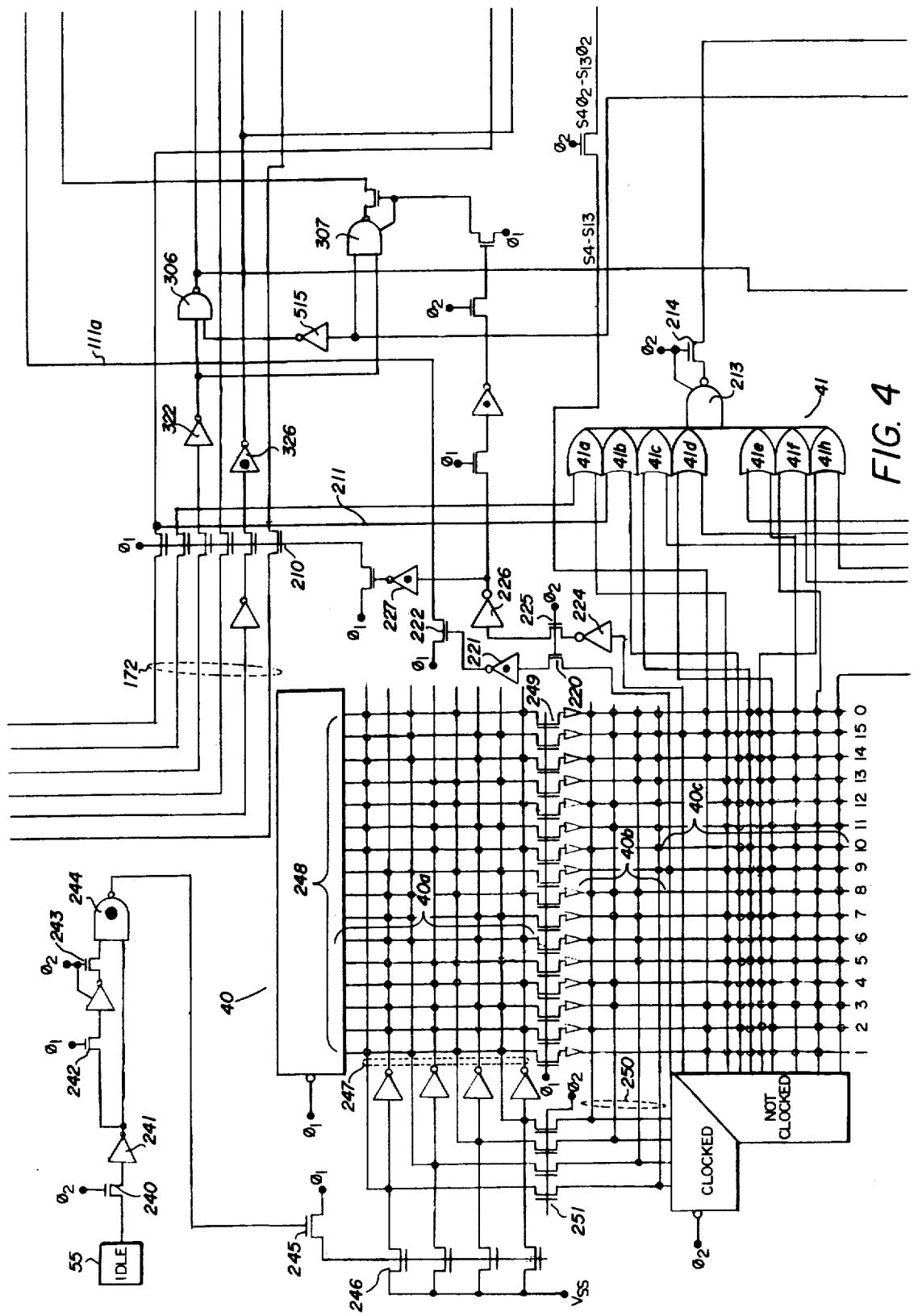
Figure 5:
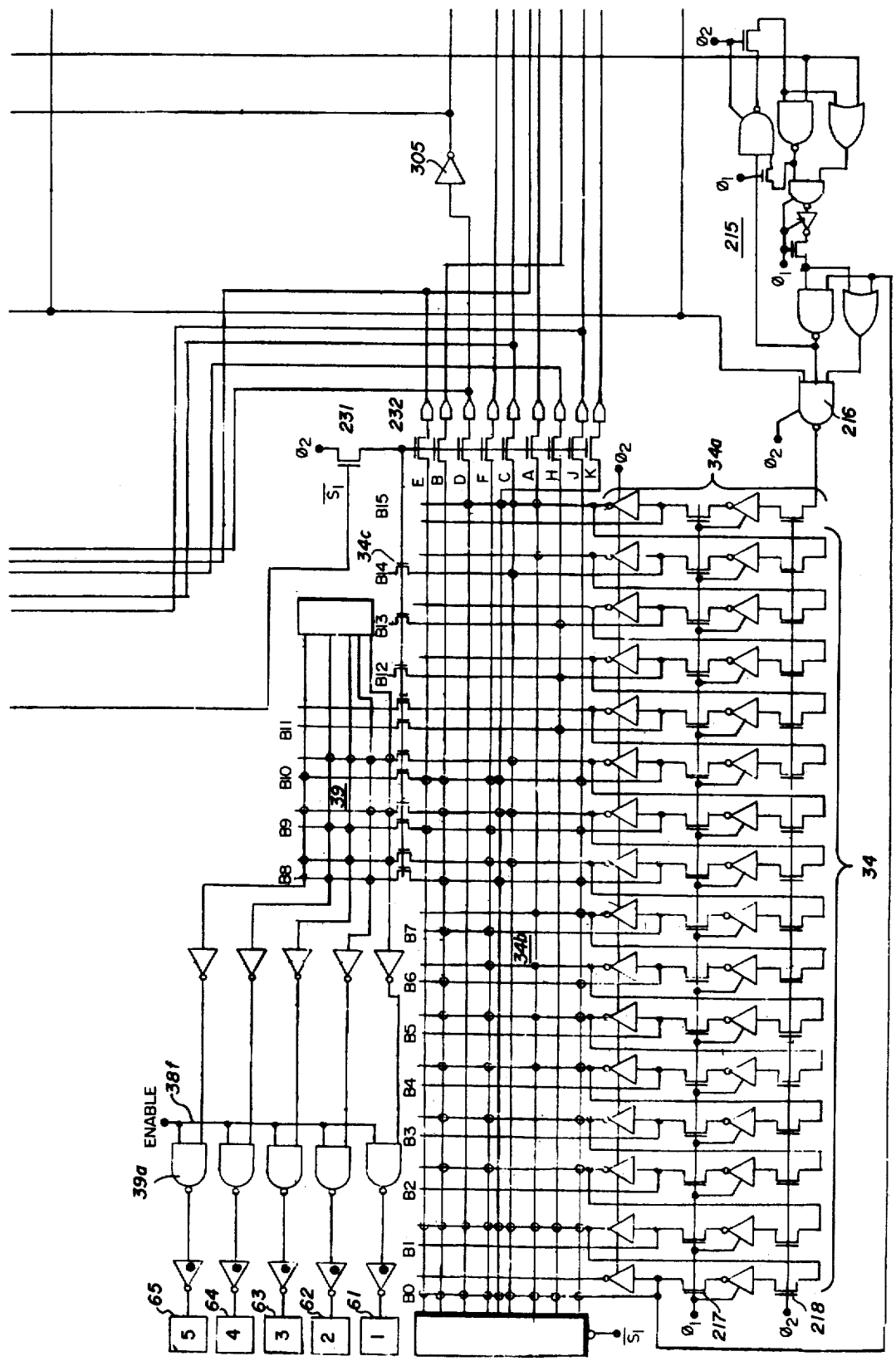
Figure 6:
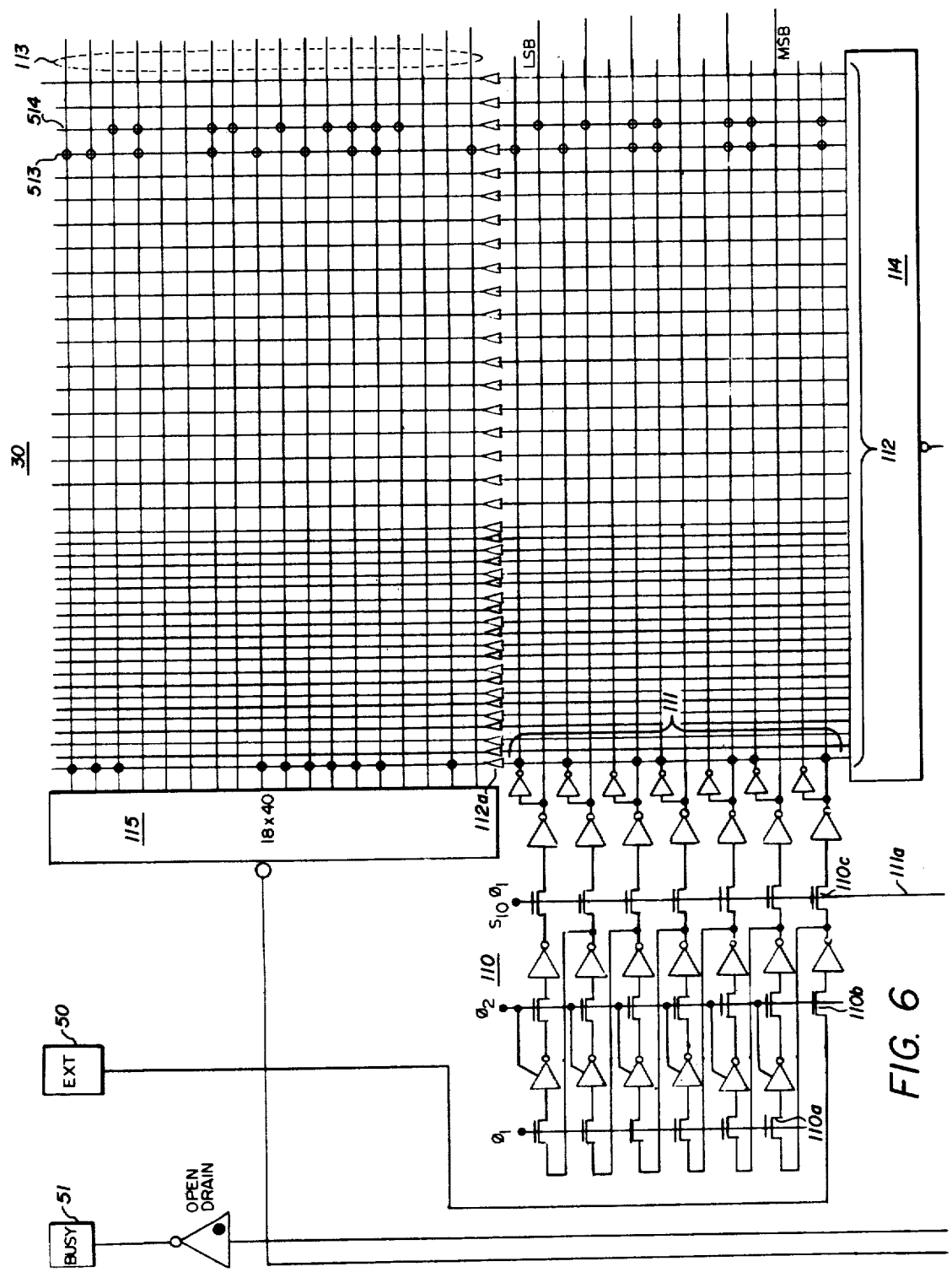
Figure 7:
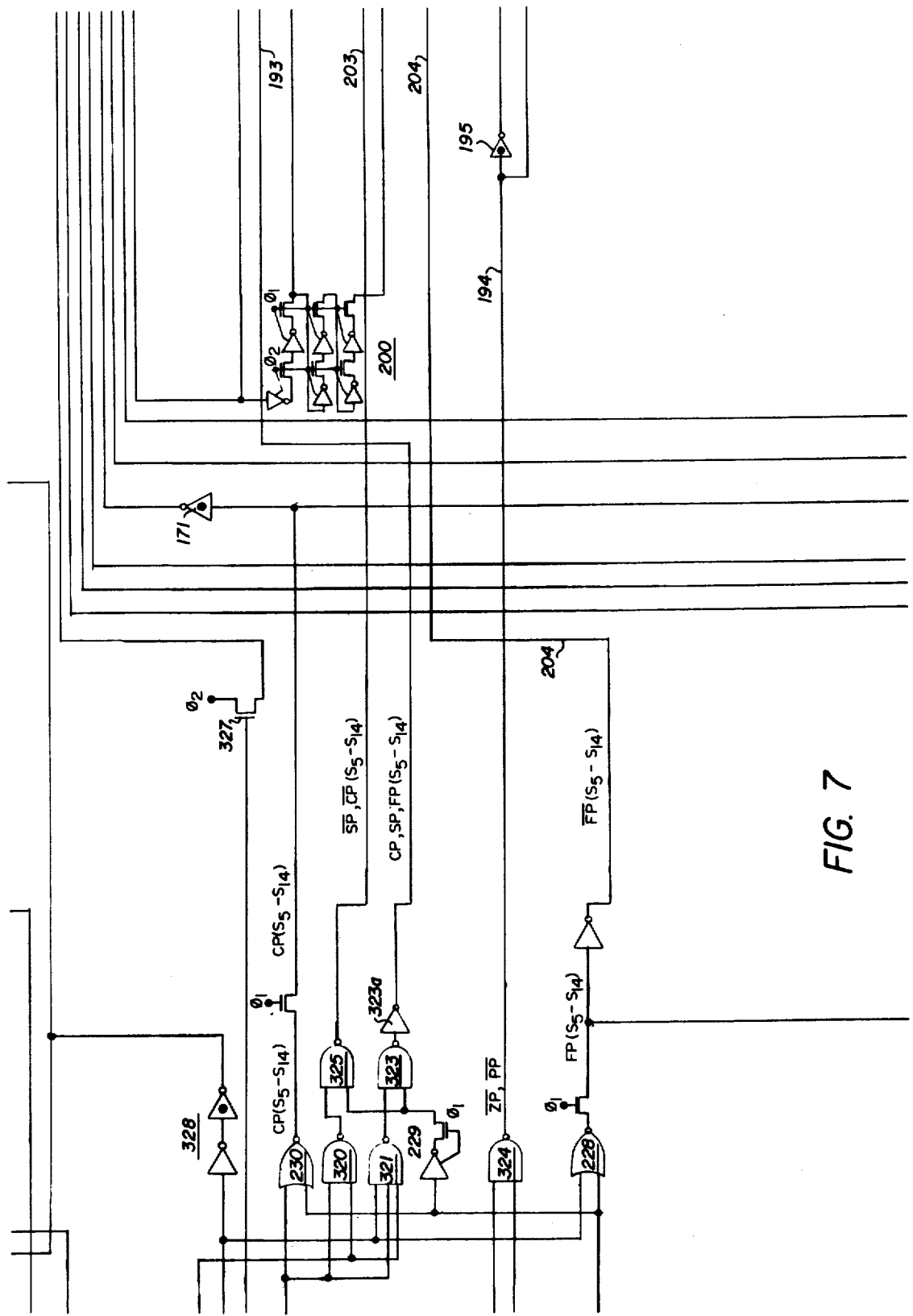
Figure 8:
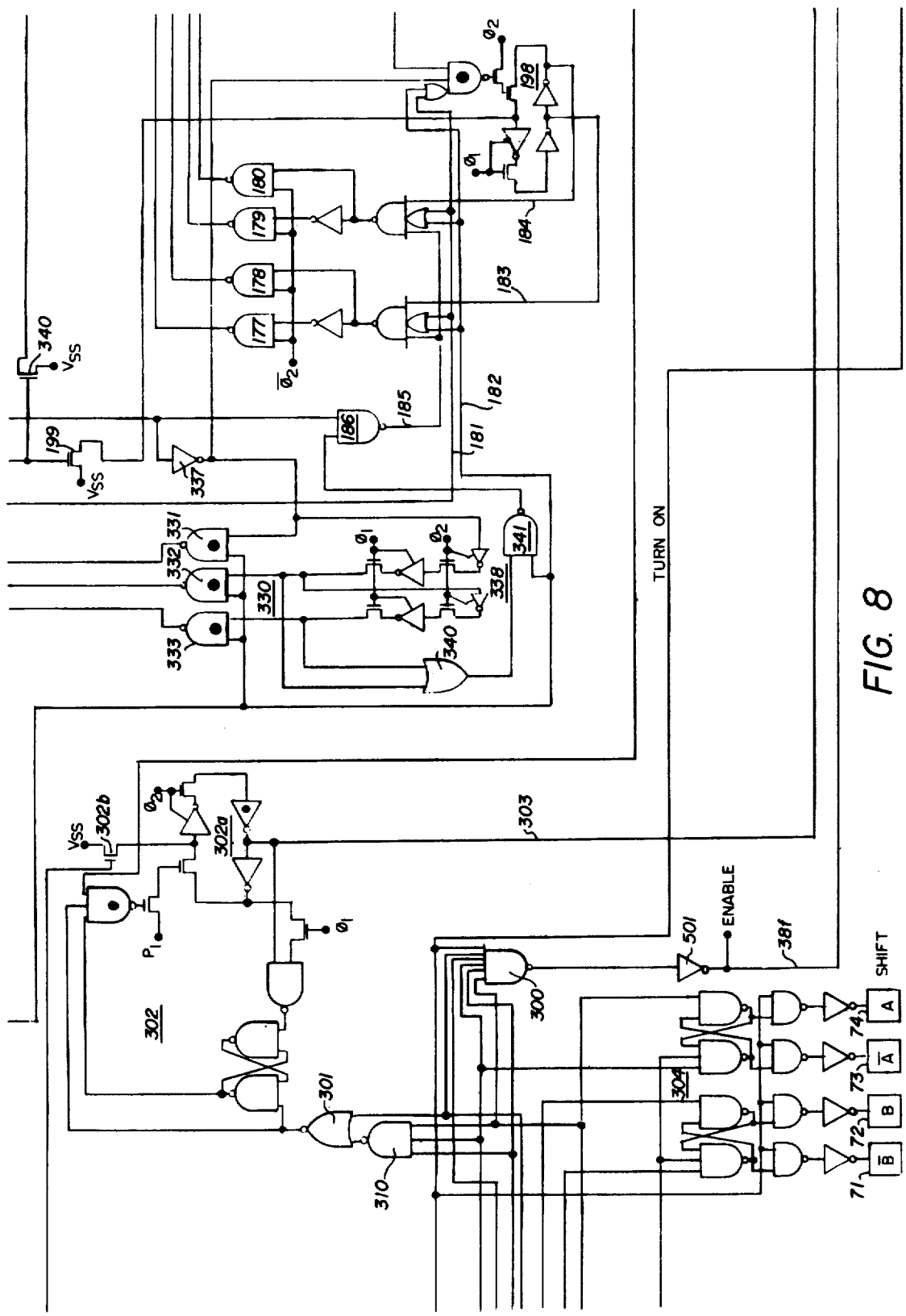
Figure 9:
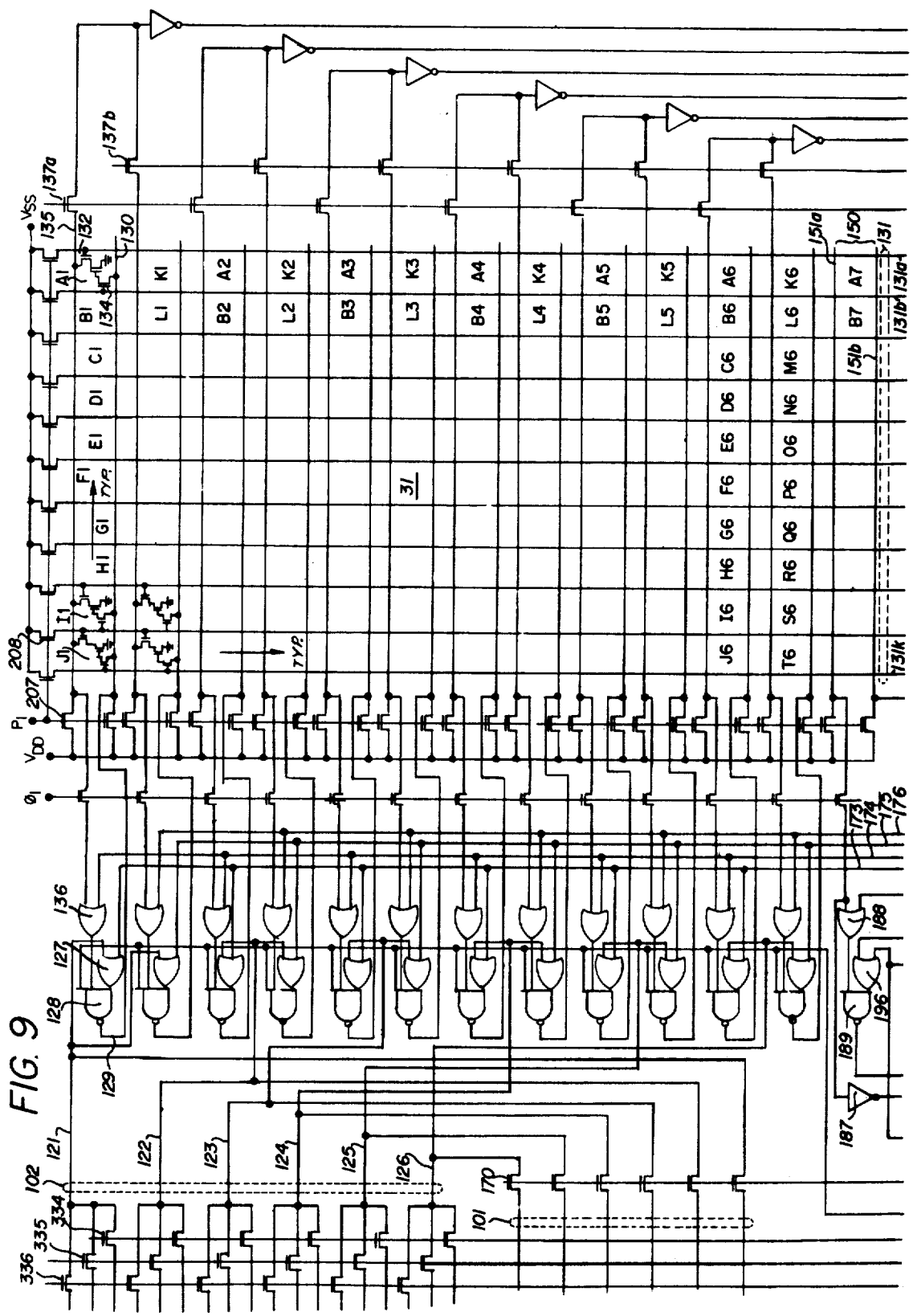
Figure 10:
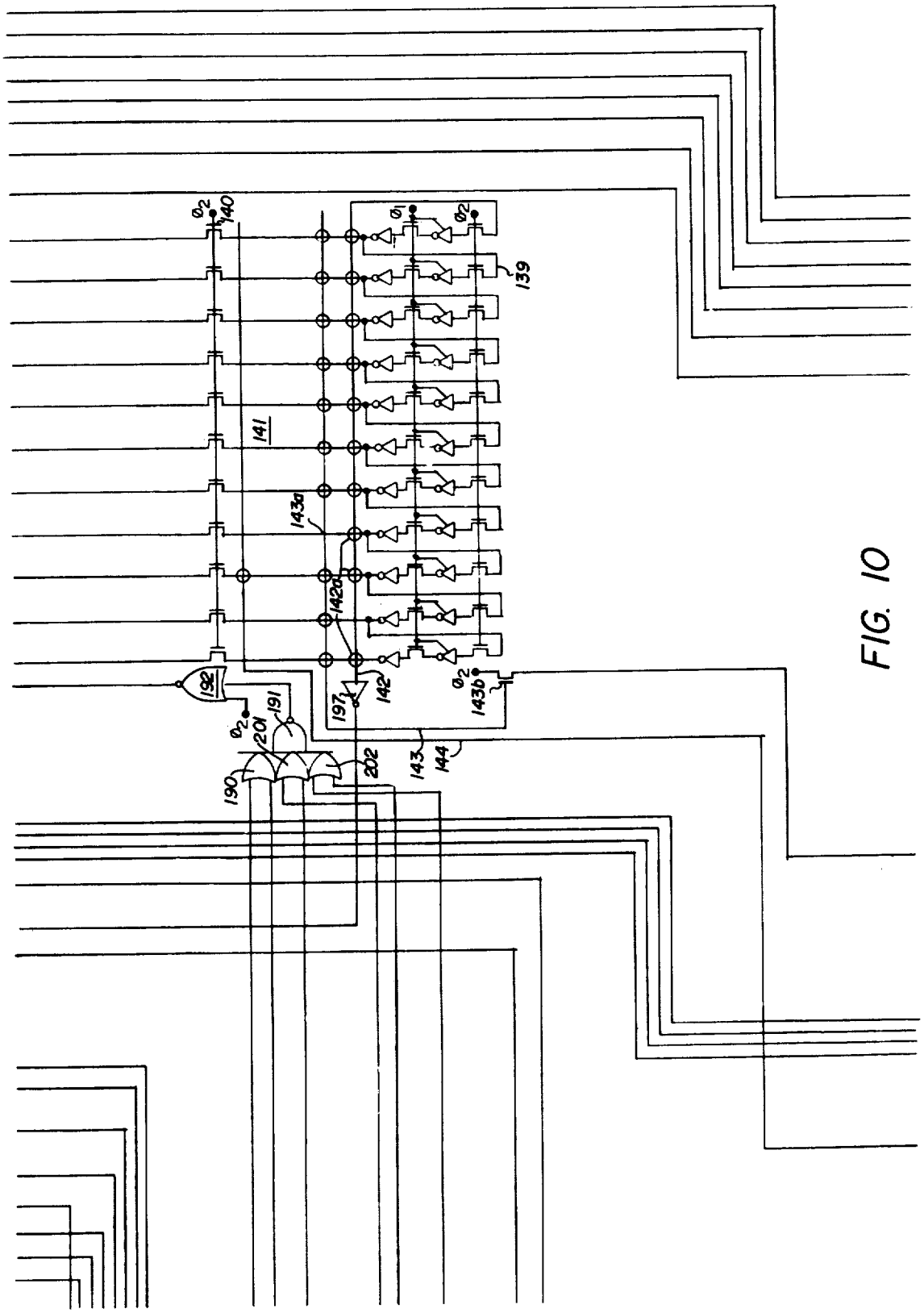
Figure 11:
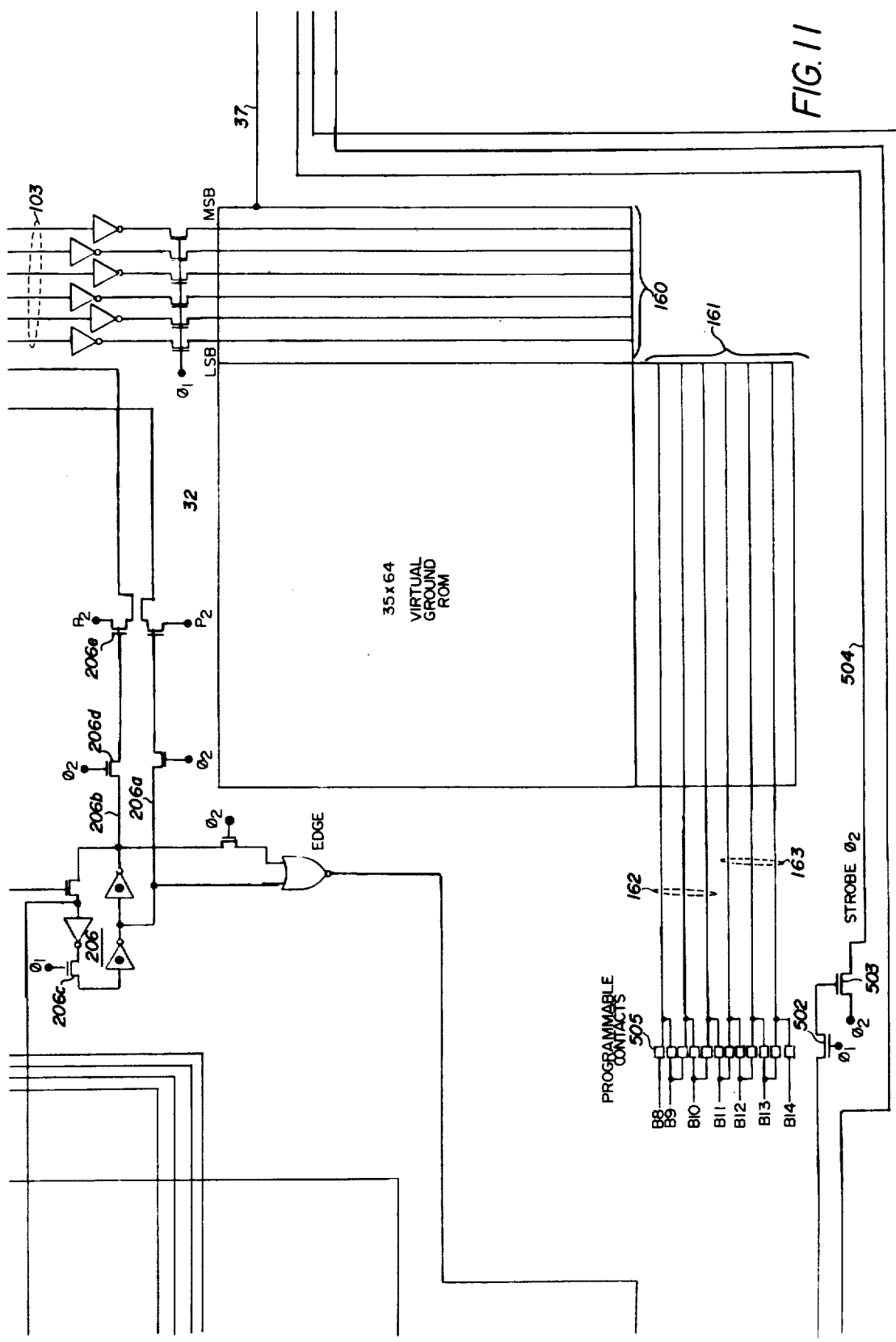
Figure 12:
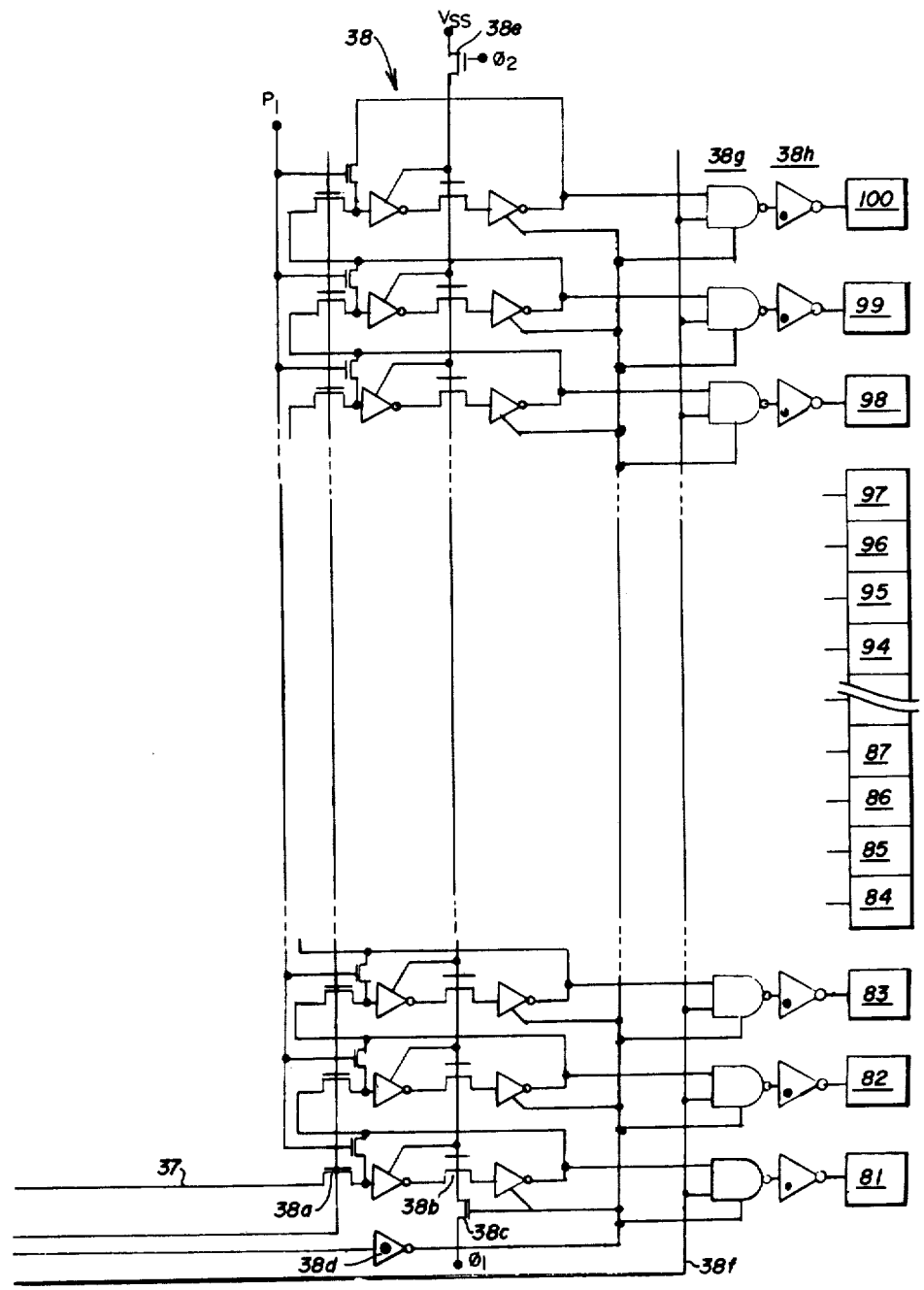

FIGS. 3–12 comprise a schematic diagram of one embodiment of the calculator chip of FIG. 1;

FIG. 3b describes the relative positions of FIGS. 3–12.

Figure 13A:
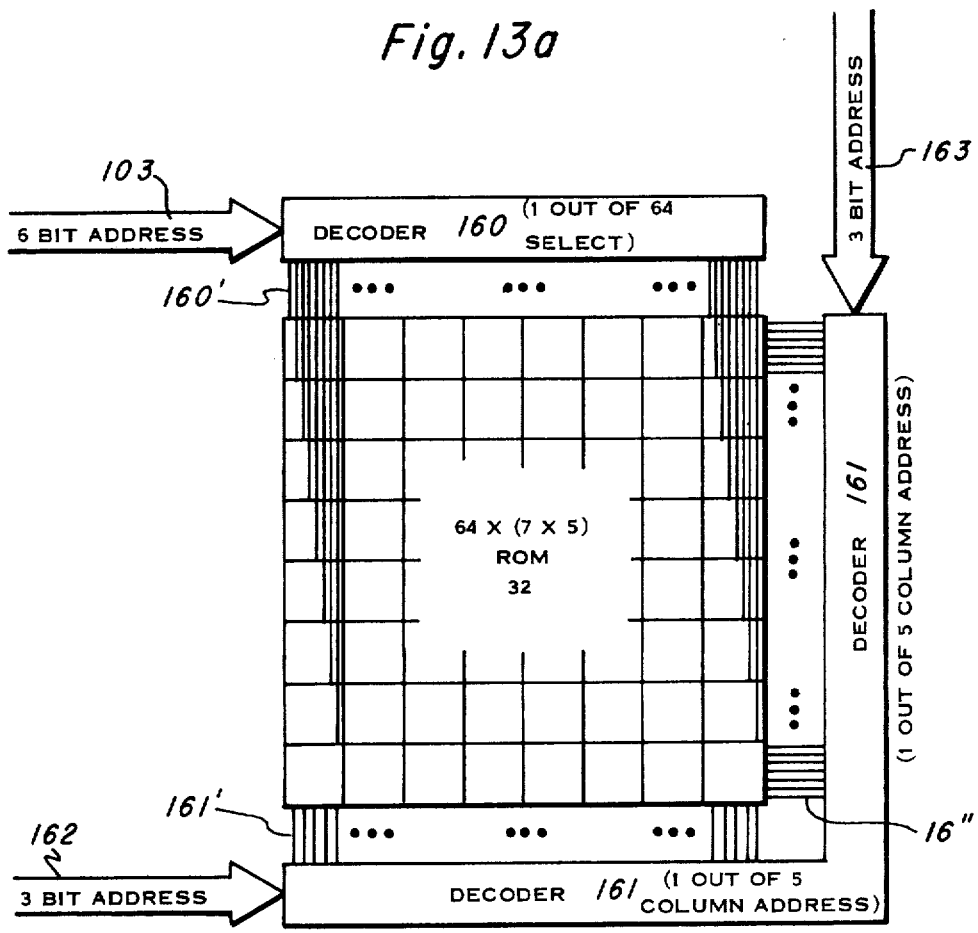

FIGS. 13a and 13b depict the ROM and address decode associated therewith according to another aspect of this invention.

Figure 14:
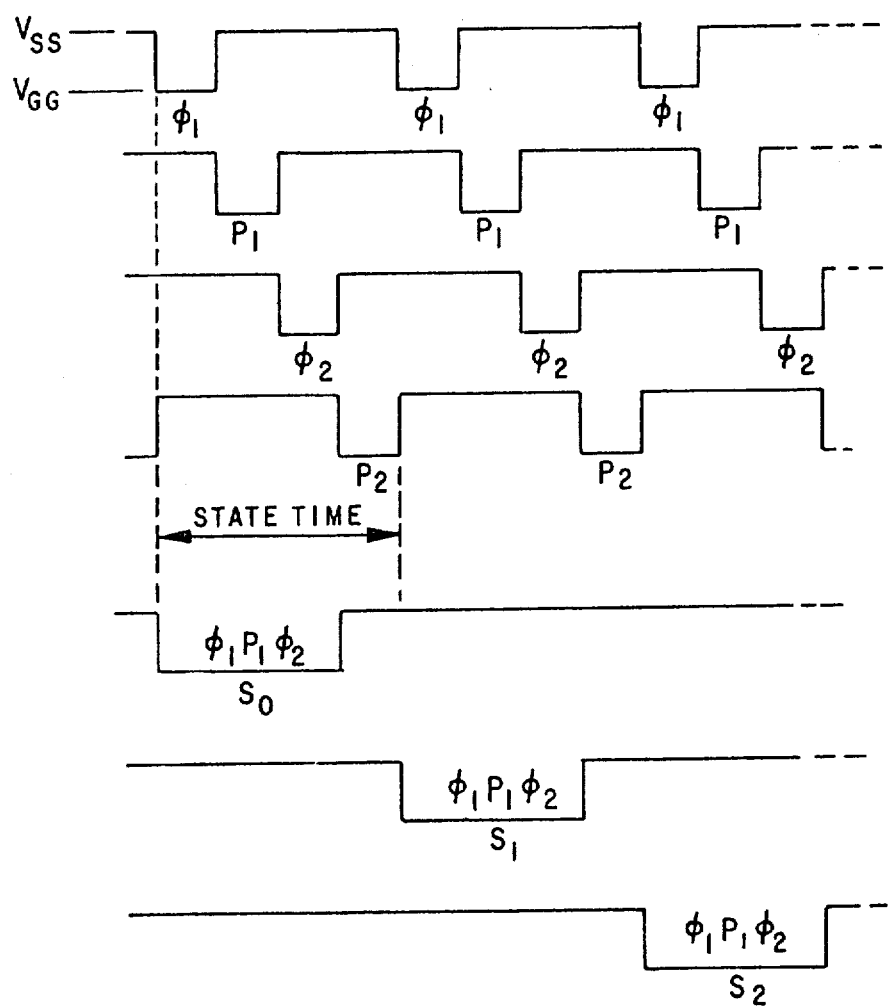
Figure 15:
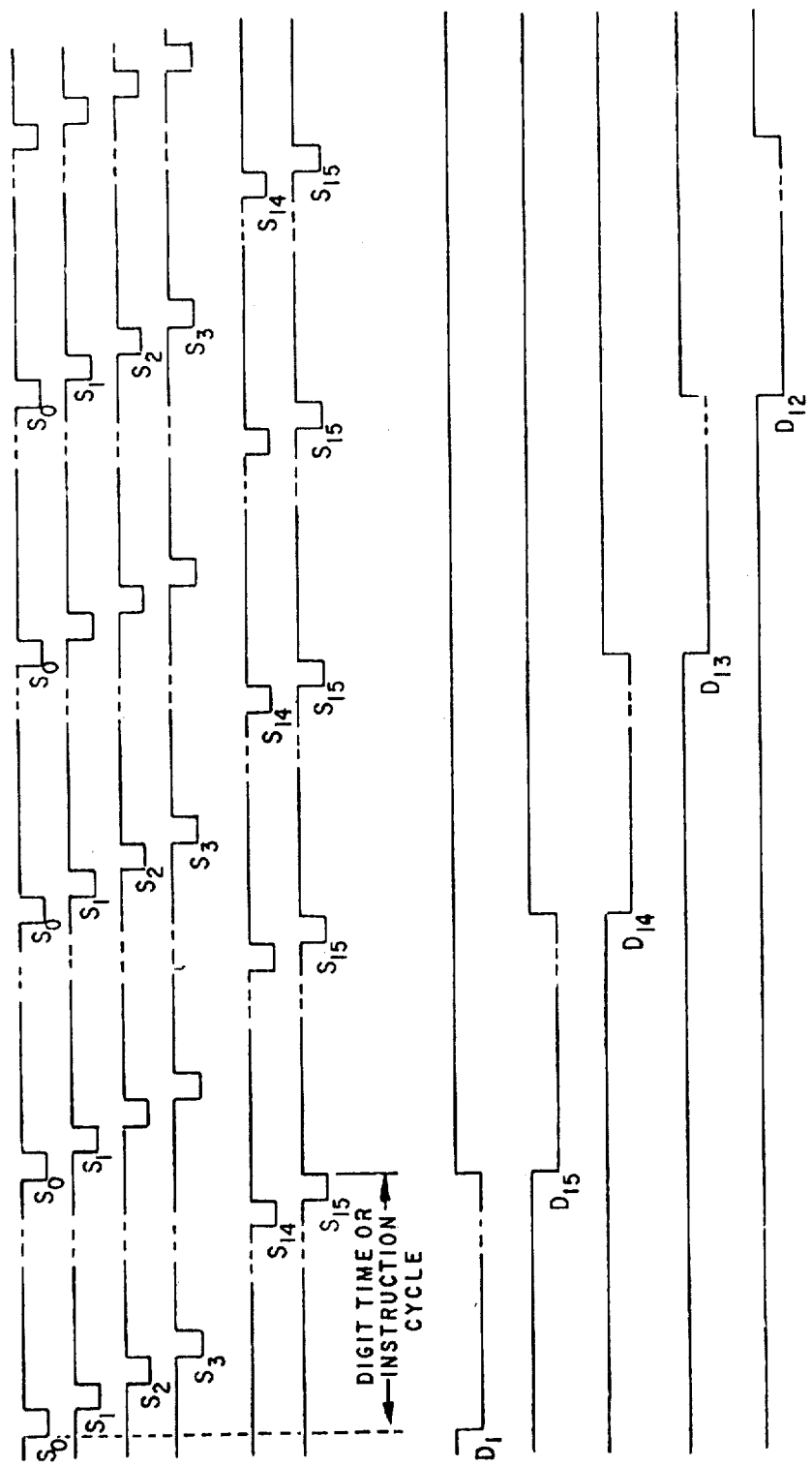

FIGS. 14 and 15 are timing diagrams showing the timing of various parts of the system.

FIG. 1

FIG. 1 illustrates in functional block diagram form a multichip calculator 10 in which the present invention may be employed.

Calculator 10 of FIG. 1 is described in detail in copending U.S. Pat. No. 3,916,169 (U.S. application Ser. No. 396,901, filed Sept. 13, 1973, by M. J. Cochran et al). Briefly, calculator 10 includes an arithmetic chip 10a and a SCOM (scanning and read-only-memory) chip 10b interconnected with a peripheral printer chip 18. Chip 18 is connected to a thermal printhead 21 by buses 22 and 23. Chip 18 is also connected to a motor 19 to step paper past printhead 21.

In addition, the following auxiliary chips are included: Ten register chips 10c and 10d; a programmer chip 10e; and a ROM chip 10f.

Arithmetic chip 10a is connected to a set of segment drivers 10g which serve to control a multielement display 10h. The output of SCOM chip 10b is connected by way of D lines to a digit driver unit 10j as well as to a keyboard 10k. A set of K lines connect the output of keyboard 10k to arithmetic chip 10a.

The present invention is principally directed to a printing operation involving the drivers for motor 19, a printhead 21 and printer chip 18. Printer chip 18 provides a system operable to print out the data employed in and provided by clculator 10.

The heart of calculator 10 as described in the above-identified Pat. No. 3,916,169 (application Ser. No. 396,901), is comprised of the arithmetic chip 10a and the SCOM chip 10b. Arithmetic chip 10a generates a plurality of control signal which are applied: (a) to SCOM chip 10b; (b) to an external read only memory (ROM) chip 10f; (c) to the external multiregister chips 10c and 10d which provide external data word storage; (d) to the external programmer chip 10e which provides a means for programming specific subroutines in the calculator externally; and (e) to printer chip 18 to provide for controlling an output printer of the thermal printer type.

While the above-identified U.S. Pat. No. 3,916,169 (application Ser. No. 396,901) describes calculator 10 in detail, briefly, the control signals generated by the arithmetic chip 10a include the following:

EXTERNAL (EXT) indicates that the arithmetic chip is addressing SCOM storage and indicates which ROM storage (constant or programmed) is being addressed, and further communicates in multiplexed bit fasion HOLD and COND control signals. With particular reference to the operation of the printer chip 18, the EXT leads from a multibit register in calculator 10. The first three bits of the output from such register address particular auxiliary units of calculator 10 with which communication is desired. Output through EXT is communicated to the printer chip 18. The data portion of each word employed by printer chip 18 comprises bits 4–10. Thus, data continuously flows through EXT and is received by chip 18 but is used only in response to a particular command given to chip 18, which command selects and permits utilization of bits 4–10 only.

A HOLD bit in EXT indicates that an interrupt is desired in the normal sequencing of a ROM in the SCOM 106 to allow additional executions by the system before the next instruction word is to be executed;

A CONDITION (COND) bit in EXT indicates that a condition latch has been set indicating status of a particular flag or the results of a comparison of flags;

IDLE ($\overline{IDLE}$) synchronizes chip 18. It is a control signal indicative of the idle condition of the chip 10a, i.e., whether chip 10a is actually in the calculating mode (non-idle) or in the display or scanning mode (idle), and provides synchronization of the timing generators of SCOM 106 to the timing generators of chip 10a.

Flag A (FLGA) is a serial output of a Flag A register in a Sequential Address Memory (SAM) in chip 10a at an output rate determined by COND.

Flag B (FLGB) is a serial output of a Flag B register in the SAM of chip 10a or is the B1 or first bit of a B register output.

Segment (SEGA–SEGB) is the data output of Data Registers for actuating the seven segment display per digit to indicate a 0–9 numeral per digit according to the D times.

Display Time (D time) comprises timed signals each occupying an instruction cycle of 16 State (S) times duration, wherein the D times are generated in cycles of 16 so that D times precess from the particular D time of the preceding cycle.

Keyboard Inputs (K lines) are signals from the keyboard for entering externally commands to the arithmetic chip.

Instruction Words (IRG) indicate the particular instruction word comprising thirteen bits ($I_0$–$I_{12}$) stored in a particular SCOM memory storage unit.

Busy (BUSY) represents the condition of the peripheral printer chip. For example, the printer chip 18 may signal that printer 18 is not/is busy and can/cannot then receive another command for printing.

Input/Output (I/O) are data lines conveying data bits from any of the various data registers and memories located in the arithmetic chip 10a, SCOM chip 10b, and 10-register chips 10c and 10d.

Arithmetic chip 10a, FIG. 1, provides output data information from its internal Registers B and/or A and Flag Register A to segment drivers 10g. Information which is provided includes: position of the comma, position of the decimal point, actual data results to be displayed from the "B" and/or "A" register and data to be displayed from the Flag A register. The segment drivers 10g comprise conventional driver circuits for actuating displays 10h which are shown to have a seven segment display plus decimal point per digit, with one digit actuated per D time. Thus for a 16 digit display in scientific notation driven by 16 D times, there are up to 14 digits in the mantissa, 2 digits for the exponent, with 2 digits utilized as annotators for the mantissa and exponent being strobed non-exclusively.

SCOM chip 10b provides the D times to the digit driver 10j for selectively scanning in sequence the digits of the display 10h and keyboard 10k. Scanning of the display 10h is explained in detail in application Ser. No. 420,999, "Variable Function Programmed Calculator", filed July 19, 1971.

SCOM chip 10b is responsive to EXT and $\overline{IDLE}$ command signals from the arithmetic chip and generates in response thereto the D times, the instruction word $I_0$–$I_{12}$, IRG and data from a constant ROM, all of which is communicated back to arithmetic chip 10a.

ROM chip 10f may be one of an expandable set of peripheral chips allowing expanded calculator capacity. ROM chip 10f is responsive to the EXT and $\overline{IDLE}$ commands from the arithmetic chip for providing a 1024 additional instruction word capacity per additional ROM chip.

Multiregister chips 10c and 10d are of a set of peripheral chips providing expanded data storage capacity of up to ten registers to calculator 10. The multiregister chips. 10c and 10d are responsive to FLAG A, $\overline{\text{IDLE}}$, and I/O information from the arithmetic chip 10a for providing recall data through the I/O lines in return to the arithmetic chip.

The printer chip 18 is responsive to EXT and $\overline{\text{IDLE}}$ commands from the arithmetic chip.

For minimizing pin count on the arithmetic and SCOM chips, and for maximizing silicon area utilization, both chips include separate timing generators for providing S and D times, with the timing generator on the SCOM chip dependent upon the arithmetic chip for synchronization. Furthermore, instead of providing separate signals on separate lines between chips representing various conditions of the arithmetic chip, such as flags and sync sygnals, as heretofore utilized in earlier multichip clculator systems, the two-chip system disclosed in said application, Ser. No. 396,901, features a multiplexed command signal from the arithmetic chip to the SCOM chip wherein each bit of a subset of bits in the command word represents the particular condition required to be transmitted. For example, the EXT signal communicated to the SCOM chip transmits a PREG, Progrm Register, signal in the $S_0$ bit indicating that the SCOM chip is being addressed, transmits a second signal in the second bit at time $S_1$ for indicating the COND condition, and transmits the HOLD condition in the third bit at time $S_2$ indicating that the ROM address register is not to be incremented. Heretofore, three separate signals and pins were required for transmitting this information. Although the arithmetic chip 10 and the SCOM chip 12 provide a basic operating calculator system as disclosed in said application, Ser. No. 396,901, now U.S. Pat. No. 3,916,169 the chip pair provides a basic system which accommodates peripheral storage and output function chips, preferably implemented in MOS/LSI utilizing novel methods of addressing for minimizing pin count.

FIG. 2

Figure 2:
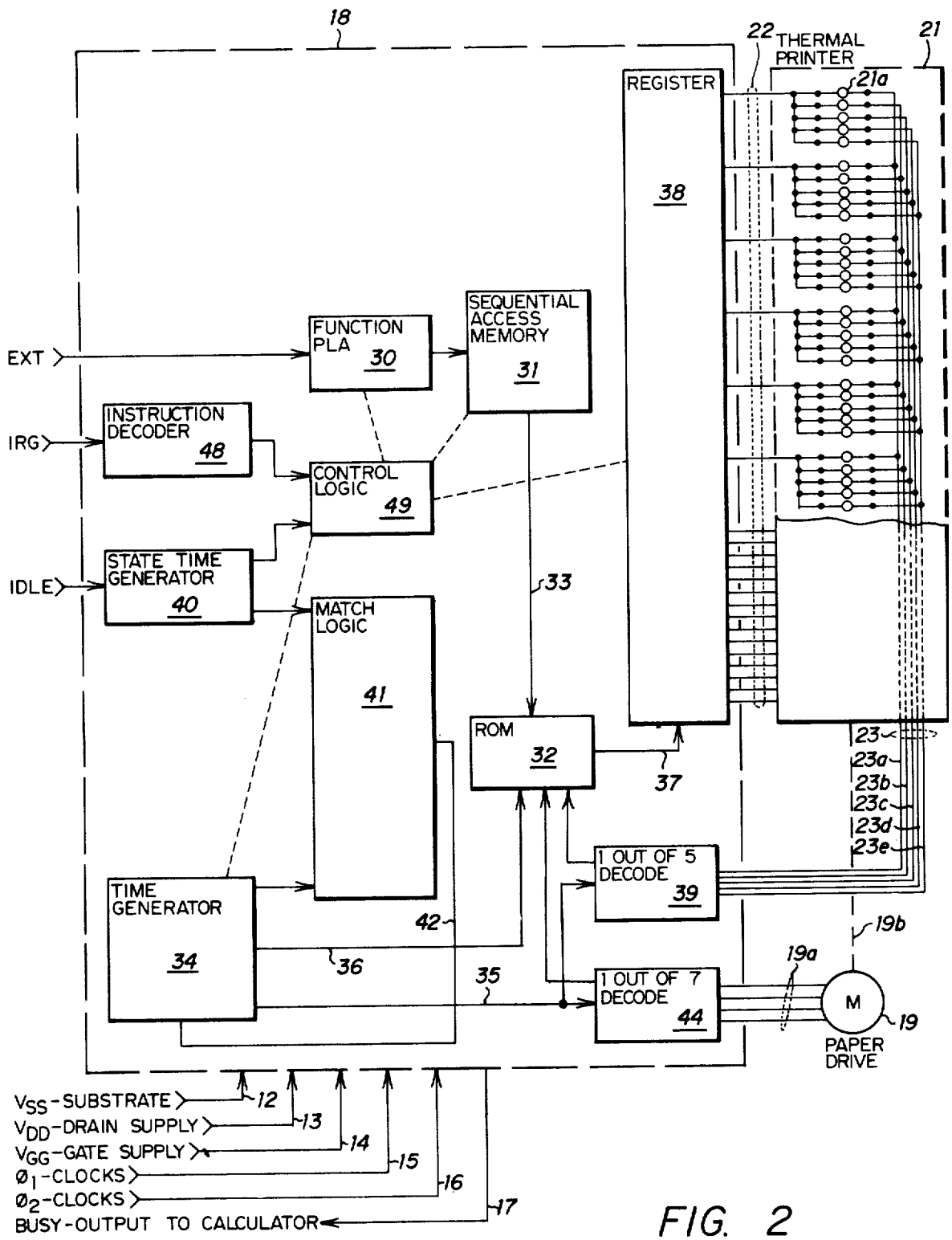
FIG. 2 is a block diagram of a printer depicting another embodiment of the invention.

FIG. 2 is a block diagram of a large scale integrated circuit chip 18 which utilizes calculator 10 outputs and controls for the purpose of driving a thermal printbar, to print on thermally sensitive paper characters which are formed on the basis of a dot matrix. The present example involves twenty 5 × 7 dot matrices for printing a line of up to twenty characters.

In FIG. 2, a binary coded data stream from calculator 10 is received by way of line EXT leading to chip 18. Thirteen bit instruction words are derived from the readonly-memory of calculator 10. Instruction words are received by way of line IRG. A sync signal is received by way of the IDLE line and is a signal of known time relation to timing signals in calculator 10.

In addition to the EXT, IRG and IDLE lines, additional lines 12-17 extend between the calculator 10 and chip 18. They are as follows:

Line 12 supplies chip 18 with the same voltage $V_{SS}$ employed on the substrate of the associated calculator.

Line 13 supplies the $V_{DD}$ drain supply voltage.

The line 14 supplies the $V_{GG}$ gate supply voltage.

Line 15 supplies a clock pulse $\phi_1$.

The line 16 supplies a clock pulse $\phi_2$.

The line 17 supplies to calculator 10 a signal indicating that chip 18 is busy, engaged in an assigned task not completed.

Components on chip 18 operate collectively to energize resistive-type heaters formed in the printhead 21. The printhead 21 comprises a linear array of 100 heaters 21a. Heaters 21a are arranged in sets of five. Collectively, twenty sets of five heaters per set span a thermally sensitive paper tape on which the output of calculator 10 is to be printed. For each character, the system prints a 5 × 7 matrix selectively one row at a time with the paper being stepped by a motor in the interval between printing of the successive rows. Each set of five heaters is spaced apart physically to provide space between printed characters. Twenty character strobe lines 22 are connected to printhead 21. Each of strobe lines 22 is connected to each of a set of five heater input teminals. Column strobe lines 23 are five in number and are individually connected to the first, second, third fourth and fifth heaters, respectively, in each set. More particularly, line 23a is connected to the first heater in each of the twenty sets. Line 23b is connected to the second heater in each of the twenty sets. Lines 23c, 23d and 23e likewise are connected to the third, fourth and fifth heaters, respectively, in ech of the twenty sets.

A data stream on line EXT is supplied to a function programmable logic array 30, the output of which is stored in a storage device 31. One such storage device is a sequentially addressed memory (SAM) as now well known in the art and described in detail in above referenced application Ser. No. 420,999. The provision of such a decoder 30 is a feature of this invention which allows communication of both character and function print data to be supplied on the same serial input, thereby minimizing pin requirements. SAM 31 stores a six bit word to designate by decoding each of the twenty characters that are to be printed by the printhead 21. A read-only-memory (ROM) 32 is provided to store a 35 bit code for each of 64 alphanumeric characters capable of being printed by a printhead 21. A bus 33 supplies the code from SAM 31 to ROM 32 for a one-in-seven decode and by way of a three line bus 36 for a one-in-five decode so that there is produced on the output line 37 a serial binary code which is stored in storage means 38 such as a shift register. When 20 bits are stored in shift register 38, representative of the locations of desired dots to be printed, selected heaters are energized locally to burn the thermally sensitive paper. The three line bus 36 is also connected to a decoder 39 to energize the five line output bus 23.

Sync timing pulses on line IDLE are applied to a state time generator 40, the output of which is applied to a MATCH logic 41. Provision of an internal timing generator synchronized by a dual function signal such as IDLE is a feature of this invention minimizing pin requirements. The timing generator 34 is also connected to MATCH logic 41, whose output is connected by line 42 to the generator 34 for synchronizing the same and for control of the time relationship of the signals on the output buses 35 and 36. Bus 35 is connected to a decoder 44 to control lines 19a which energized step motor 19. Motor 19 operates a mechanical linkage 19b to step thermally sensitive paper tape past the printhead 21.

Instruction words on line IRG are applied to an instruction decoder 48. The output of decoder 48 is applied to control logic 49 which is connected to various elements throughout the system as will be shown, A general functional description of the load-print cycle is as follows. A zero print command (ZP) over IRG at the beginning of the load sequence clears the SAM 31. The characters to be printed are loaded into the SAM 31 from left to right, i.e., the first character loaded will be the right most character in the printed output, and the last character loaded will be the left most character in the printed output. Each "character" is loaded by sending its proper seven bit code over EXT, six of which bits are loaded into SAM 31 upon a subsequent character print (CP) command received over IRG, and decoded in decoder 48 for activating control logic 49 accordingly. If a blank in the printed output is desired, a step print (SP) command is transmitted over IRG for actuating logic 49 effecting a six bit code to be entered into the SAM representing a blank.

If a function command is transmitted over EXT, its seven bit code is communicated to the PLA 30. A function print command (FP) transmitted on IRG actuates logic 49 to enable a seven bit code representing the function to be decoded by the PLA 30 which generates in response thereto three six bit codes representing a three charcter function grouping to be loaded into the SAM 31. When all twenty characters plus blanks desired in the output have been loaded into the SAM 31, a print command (PP) over IRG via logic 49 actuates timing generator 34 to begin sequencing. Generator 34 strobes the first row of each selected ROM grouping corresponding to each A group of the 20 character printer, while the SAM 31 powers up in sequence each selected character code partitioned in the ROM 32. Sixty-four codes are partitioned in the ROM 32, and the SAM 31 powers up only the grouping in the ROM corresponding to the character desired to be printed at that particular strobed time. That is, 20 six-bit words address in sequence twenty blocks of ROM 32 for burning the first dot of each A group. Then the second dot of each A group is enabled due to decode 39 and after 20 additional addresses from the SAM 31, with each address being communicated during one S time, the second dot of each dot group is printed, etc. After a total of 5 × 20 S times, the first row of dots is completed for all twenty characters. The decoder 44 addresses the rows of the ROM representing the second row of each character. After a total of 5 × 20 × 7 or 700 addresses from the SAM 31, a complete character line is printed.

Time generator 34 counts instruction cycles and waits between activations of the one-out-of-seven decoder 44 until sufficient time has elapsed, i.e., five milliseconds, to complete the burn.

A sample sequence is set out in Table I below illustrating generation of a typical printed output.

TABLE I

| Desired Output | 1.234567890 - 45 | LNX |
|---|---|---|
| | IRG | EXT |
| 1) | — | 7 bit code for LNX ( ) |
| 2) | FP | |
| 3) | SP | |
| 4) | SP | |
| 5) | | |
| 5) | CP | 7 bit code for 5 (0000110) |
| 7) | | 7 bit code for 4 |
| 3) | CP | |
| 9) | | 7 bit code for — |
| 10) | CP | |
| 11) | | 7 bit code for 0 |
| 12) | CP | |
| 13) | | 7 bit code for 9 |

TABLE I-continued

| Desired Output | 1.234567890 - 45 | LNX |
|---|---|---|
| | IRG | EXT |
| 14) | CP | |
| 15) | | 7 bit code for 8 |
| 16) | CP | |
| 17) | | 7 bit code for 7 |
| 18) | CP | |
| 19) | | 7 bit code for 6 |
| 20) | CP | |
| 21) | | 7 bit code for 5 |
| 22) | CP | |
| 23) | | 7 bit code for 4 |
| 24) | CP | |
| 25) | | 7 bit code for 3 |
| 26) | CP | |
| 27) | | 7 bit code for 2 |
| 28) | CP | |
| 29) | | 7 bit code for . |
| 30) | CP | |
| 31) | | 7 bit code for 1 |
| 32) | CP | |
| 33) | PP | |

With the foregoing brief description of the invention as illustrted in block diagram form, there will now be described a detailed circuit of one embodiment of the invention.

FIGS. 3 – 12

FIGS. 3–12 illustrate details of a printer chip 18 employed in the present invention. The chip has a plurality of edge contacts for communication with calculator 10. The contacts are as follows:

Contact 50 (EXT) is provided for flow of a data stream of seven bits per instruction cycle from calculator 10.

Contact 51 (BUSY) serves to transmit from chip 18 to calculator 10 a signal indicating that it is busy in carrying out a function that has been commanded.

Contact 52 (IRG) is connected to an instruction register in calculator 10 and provides for flow to chip 18 of instructions to be executed. In this embodiment, thirteen bit instructions are transmitted to chip 18 as a serial bit stream. Chip 18 also has a companion contact 53 to accommodate a different calculator wherein two simultaneous instruction bit steams are formed, one of seven bits (contact 52) and the other of six bits (contact 53) to form each thirteen bit instruction.

Contact 54 (PFS) provides for disabling chip 18 when the paper stock in the printer unit is exhausted.

Contact 55 (IDLE) is provided to synchronize chip 18 and calculator 10. When the voltage on this terminal falls from a one to a zero state, chip 18 is then forced into a synchronized operating state. Chip 18 has operating states 0–15.

Terminals 61–65 are employed to connect chip 18 to the twenty sets of heaters in printhead 21. Terminal 61 is to be connected to the first heater in all of the twenty sets of five heaters. Similarly, terminal 62 is connected to the second heater in all 20 sets. Similarly, 63, 64 and 65 are connected to the third, fourth and fifth heaters in all twenty sets of heaters, Terminals 71–74 are connected to the input terminals of motor 19, preferably a four-phase stepping motor employed to drive paper 45 past printhead 21, as shown in FIG. 1.

Terminals 81–100 are to be connected to the twenty sets of heaters in printhead 21. Terminal 81 is connected to the five heaters through which the most significant digit is printer. Terminal 100 leads to the sets of heaters through which the least significant digit is printed.

There are five service contacts on chip 18 which are not shown in FIGS. 3–13. Voltages supplied via the service contacts are labeled at various points throughout the logic circuits. As previously described in describing FIG. 2, the five sevice contacts supply the following:

1. $V_{SS}$ - the substrate voltage supply;
2. $V_{DD}$ - the drain voltage supply;
3. $V_{GG}$ - the gate voltage supply;
4. $\phi_1$ - a clock pulse of a first phase;
5. $\phi_2$ - a clock pulse of a second phase.

$\phi_1$ and $\phi_2$ are negative going clock pulses that, in the embodiment herein described, occur at 192 KHz repetition rate, are of 1 microsecond duration, and are 180° out of phase. State times for chip 18 each begin with a $\phi_1$ pulse.

Before describing the elements of chip 18 in further detail, it is noted that the calculator provides a stream of data bits by way of terminal 50 which are in seven bit words. Data words enter a data bit register serially and are then applied in parallel to a programmable array 30. Array 30 is operated such that a symbol to be printed is coded on six output lines 101. When a multisymbol function is to be printed, the function is selected by way of lines 102. Up to twenty selected symbols are loaded from array 30 into a sequential access memory (SAM) 31. Output lines 103 lead from SAM 31 and are connected to a ROM 32. Timer 34 strobes a one out of five select, thereby to control the dots in the individual columns that are to be printed. Timer 34 also strobes a one out of seven select which is applied by way of lines 163 to ROM 32 to select the rows on which dots are to be printed.

Instructions enter chip 18 by way of terminals 52. Instruction decoder 48 responds to the following instructions:

1. PP (print)
2. PAP (step paper)
3. SP (step print)
4. FP (function print)
5. ZP (zero print)
6. CP (character print)

Decoded instructions control loading of SAM 31 and the subsequent utilization in printing information loaded into SAM 31.

DATA CHANNEL

Terminal 50 is connected by way of an external bit register 110 to programmable array 30. Seven bits during $S_3$–$S_9$ are clocked into the register 110 through $\phi_1$ gates 110a and $\phi_2$ gates 110b by application of the two clocking pulse $\phi_1$ and $\phi_2$, which hereinafter will be referred to simply as $\phi_1$ and $\phi_2$. Register 110 is of a conventional MOS construction. A control pulse shifts the contents of the register (the seven data bits) to the array 30 during chip state time $S_{10}$ through a $S_{10}\phi_1$ gate 110c.

Array 30, in its first section, has 14 input lines 111 comprised of the true and complement from each of the seven stages of the register 110. Array 30 has 40 select lines 112. The select lines 112 are connected by way of contacts 112a to forty input lines in the second section of array 30. The second section of array 30 is then provided with eighteen select lines 113. The select lines 112 are terminated in a load unit 114. The select lines 113 are terminated in a load unit 115.

Array 30 is of known construction in MOS technology and provides for selection through output lines 101 of any single desired symbol that is to be printed. Selection may be made by way of lines 102 of any of 40 available sets of three symbols that are to be printed as function labels.

Array 30 is connected by way of six data output lines 121–126 to the sequential access memory (SAM) 31. Each symbol to be printed is represented by a six bit code.

Codes for up to twenty symbols to be printed which enter through terminal 50 pass through the array 30 and are stored in SAM 31. The six bits representing the first symbol to be printed, for example the least significant digit, will be stored in cells A1–A6 of SAM 31. The code for the second symbol is stored in cells B1–B6. The code representing the eleventh symbol is stored in cell K1–K6. Similarly, the code representing the twelfth symbol is stored in cells L1–L6 and the code representing the twentieth symbol is stored in cells T1–T6.

While construction of only cell A1 in memory 31 has been shown, all cells are identical in construction. Each comprises three FET gates connected for charge transfer from a line 130 to a line 135 in response to states on address lines.

Under the control of a free running commutator 139, data is stored in SAM 31 and is read out continuously to appear on the six output lines 103.

Output lines 103 are connected to a ROW decoder of conventional design symbolized at 160 which is associated with ROM 32. ROM 32 is a 35 × 64 virtual ground read-only-memory. The code on lines 103 at any instant addresses one of the 64 lines in memory 32. The memory 32 is coded to control the burn of 35 available spots for each of up to 64 symbols.

The data on lines 103 together with timing functions applied to the ROM 32 produce on output line 37 trains of pulses which enter the shift register 38 and are shifted there through by way of a strobe gate 38a and a set of gates 38b. $\phi_1$ pulses are transmitted to gates 38b by way of a gate 38c. Gate 38c is enabled by the output of an inverter 38d on which the print command PP ultimately appears. The voltage state $V_{SS}$ is employed in gates 38b by way of a $\phi_2$ gate 38e to refresh the register 38. An enable state on line 38f is employed to apply the contents of register 38 through a bank of AND gates 38g and a bank of drivers 38h to the output terminals 81–100.

THE CONTROL CHANNELS

A column decoder 161 is connected to ROM 32 for providing the other input for selecting the data from ROM 32 to be shifted to register 38. Three lines 162 are decoded cyclically as a one-of-five decode. Three lines 163 are decoded as one-out-of-seven decode.

In order to print a given symbol, the code representing that symbol stored in cells A1–A6 of SAM 31 is read out and appears on lines 103 many thousand times during the printing of a single line. The code representing that symbol is utilized by the ROM 32 35 times, once for each of the 35 possible burn locations in a 5 × 7 matrix. The code on lines 162 changes to address the five columns in the matrix. The code on lines 163 changes to address the seven rows in the matrix.

Construction and operation of a typical virtual ground read only such as memory 32 and the manner of addressing the same is described in detail in appliation Ser. No. 397,060, filed Sept. 13, 1973.

With the foregoing understanding of the object of collecting the twenty symbol codes in SAM 31, the system for control of collecting them will now be briefly described. SAM 31 is of the same construction as described in above-identified application Ser. No. 396,902. It will be understood that SAM 31 provides six twenty bit commutated memory registers plus a ten bit pointer register. In the form actually constructed and illustrated, SAM 31 is a twelve ten bit commutated registers. The first bit of the first ten codes from array 30 enters SAM 31 through line 121 leading to a NOR gate 127 whose output is connected to a NAND gate 128. The output line 129 is then connected to an input line 130. A cell address line 131a, when low, serves to render a gate 132 conductive to read from cell A1 onto output line 135. When the second address line 131b goes low, the gate 134 conducts to store in cell A1 the signal level on input lines 130. Data read out of cell A1 onto line 135 may be circulated back into cell A1 by way of OR gate 136. At the same time, output data is available to read out to lines 103 with bits in cells A2-A6 by actuation of a set of $\phi_1$ strobe gates 137a. Data from the second half of SAM 31 is read out by actuation of a set of $\phi_1$ strobe gates 137b. Sets of states stored in cells, such as states in cells A1-A6, appear on the output lines 103.

Lines 131a and 131b comprise two of the set 131 of eleven cell address lines which lead from a commutator 139. Commutator 139 serves sequentially to cause lines 131a, 131b . . . 131k to go low upon application of successive $\phi_2$ clocks to the $\phi_2$ gates 140.

Commutator 139 is free running driven by $\phi_1$ and $\phi_2$. The output of commutator 139 includes a programmable array 141 in addition to addressing SAM 31. Array 141 has eleven input lines 131 and three select lines 142, 143 and 144. Select line 142 is connected in the feedback loop of commutator 139 and thus provides for the recirculation through commutator 139 of one zero level in a string of one levels. This is accomplished because the select liner 142 is connected to all but one of the input lines 131 by transfer gates 142a.

The thirteenth register 150 in SAM 31 is provided for selective location of a pointer. The pointer is a one state in a series of zero states. It is employed in connection with the loading of SAM 31 only. Before describing further the action of the pointer generator and its use, certain additional controls for loading SAM 31 will be described. Select lines 101 lead from PLA 30 to SAM 31 by way of a set of gates 170. Gates 170 are rendered conductive by the output of an inverter 171. The inverter 171 transmits a character print command (CP) during the state times S5-S14. With gates 170 conductive, the code on the lines 101 is made available at the input to SAM 31. The CP command appears on one of the output lines 170 from decoder 48. It is produced under the following circumstances given by way of an example. In the calculator, if the keyboard is actuated to enter the three digit number 478 and that is followed by actuation of the + function button, the three digit set normally is caused immediately to appear on the calculator display. If it is desired to utilize chip 18 to print displayed data on paper, then the calculator keyboard print button would be depressed. The calculator then acts to apply through terminal 52 a zero print instruction. Thereafter, there would be applied through external terminal 50 a train of seven bit words to represent the three displayed digits 478. Following each of the seven bit words, a CP instruction enters through terminal 52. Each resultant CP command effective during the state times S5-S14 transfers six bits of the preceding seven bit word from the array 30 to the inputs to the SAM 31. Following entry of the final digit of the desired set into the SAM 31, the calculator transmits by way of terminal 52 the print command (PP). This causes chip 18 automatically to energize the heater elements in the associated printer in accordance with the information stored in SAM 31 in sequences controlled by the timing system on chip 18.

Codes from array 30 are entered into SAM 31 under control of states of lines 173-14 174. When a zero level state is applied to OR gates such as gate 127, data on lines 121-126 enters SAM 31. When line 174 is energized, data read from SAM 31 is recirculated and loaded back into the same location from which it was read. When lines 173 or 174 are energized, the loading or recirculating operation takes place exclusively in the first half (cells A1-A6 to J1-J6) of SAM 31.

When lines 175 or 176 are energized, operations take place in the second half of SAM 31, namely in the second half cells K1-K6 to T1-T6. Lines 173-176 are operated under the control of a load-up latch which includes four AND gates 177-180. The inputs to the latch are five in number. The first input provides a CP command on line 181. The second provides an FP command on line 182. The third provides a signal to control or energize the first half of the SAM 31 and appears on line 183. The fourth is a line to control operation in the second half of SAM 31 and appears on line 184. The fifth input is the pointer which appears on line 185.

It will be noted that line 185 leads from an AND gate 186 which is connected to the output line 151a of the register 150 by way of an inverter 187. The output line 151a is also connected by way of OR gate 188 and to a NAND gate 189 whose output is then connected by way of an OR gate 190, NAND gate 191 and NOR gate 192 to the input line 151b. The second input to OR gate 190 is supplied by way of line 193 which serves to actuate OR gate 190 when any one of the signals CP, SP, or FP is present during the states S5-S14. The signals ZP and PP are applied to the second input of OR gate 188 and, by way of inverter 195, to one input of an OR gate 196. The select line 142 from commutator 139 is connected by way of inverter 197 to the second input of OR gate 196. The output of inverter 195 is also connected to a gate 199 which serves to apply voltage $V_{ss}$ to a latch 198. The latch 198 has as its outputs the two lines 183 and 184. The ZP and PP commands applied to gate 199 always set the latch 198 so that operations in loading SAM 31 will always begin with the first half.

The output of AND gate 189 is connected to the input of a three stage pointer delay circuit 200. The output of the first stage of the delay circuit 200 is connected to one input of an OR gate 201 whose output is connected to NAND gate 191. The output of the third stage of delay circuit 200 is connected to one input of an OR gate 202. The second input of OR gate 201 is supplied by 1¼of line 203 which normally is maintained at a one state. SP or CP commands during the S5-S14 state times cause line 203 to go to zero level.

The second input to gate 202 is supplied by way of line 204 which is in a one state unless and until an FP command is present during state times S5-S14.

When the ZP command is applied, the output of inverter 197 is loaded by way of OR gate 196, NAND gate 189, OR gate 190, NAND gate 191 and NOR gate 192 into the register 150, causing a one level to occupy the cell A7 with all the remaining cells in register 150 being zero.

The location is register 150 of the single one state controls the location that information will be loaded from array 30 to SAM 31.

After loading cells A1–A6, in -tetrafluoro-to a CP command, the pointer (a one level) is shifted from A7 to cell B7. This is accomplished by passing the one level read from cell A7 through the first stage of the delay 200 and thence through OR gate 201, NAND gate 191 and NOR gate 192 and input line 151b back into cell B7 and leaving cell A7 at a zero level.

The two additional select lines 143 in commutator 139 control gating logic including an output flip-flop 206 to turn on or energize one or the other of gates 137a and 137b. Gates 137a when enabled cause the first half of the memory 31 to be read out onto lines 103. When gates 137b are enabled, the second half of the memory is read out onto lines 103.

A set of gates 207 are responsive to a timing pulse $P_1$ to place zeros on all of the input and output lines of the SAM 31. For this purpose a source $V_{dd}$ is connected to each of the gates in set 207. A second set of gates 208 are provided responsive to pulse $P_1$ to place a one state on each of the address lines. For this purpose, each of the gates 208 is connected to the terminal $V_{ss}$.

PRINT TIMING

With six bit words representing twenty symbols to be printed stored in SAM 31, timing sequences are initiated to actually control the printing operation. The printing operation is initiated by the appearance of a PP command at gates 210 as decoded by unit 48. Command PP is clocked through one of gates 210 and is applied by way of conductor 211 to an OR gate 41b the output of which is connected by way of NAND gate 213 and a $\phi_2$ gate 214 to an add-one circuit 215. The output of circuit 215 is connected by way of a NAND gate 216 (gated by $\phi_2$) to the input of a shift register 34a which forms part of timing generator 34. Register 34a has 16 stages. It is clocked by a set of $\phi_1$ gates 217 and $\phi_2$ gates 218. Thirty-two controlled input lines (B0–B15 and their complements) extend to a decoder 34b having nine select lines A, B, C, D, E, F, H, J and K. Timer 34 has 16 states B0–B15. Timer 34 with its decoder 34b operates in response to state timing signal S1 derived from the state time generator 40 and applied to S1 gate 231.

State time generator 40 includes a programmed array of three sections 40a, 40b and 40c, and has 16 states. Section 40c has eleven select lines. The first of the select lines is connected by way of a $\phi_2$ gate 220 and inverter driver 221 to a gate 222. Gate 222 on state 9 of generator 40 passes $\phi_1$ by way of line 111 to gates 110c to clock the data word in register 110 into array 30.

The second select line is connected by way of inverter 224 through a $\phi_2$ gate 225 to an inverter 226. The output of inverter 226 is connected by way of inverter 227 to a gate which passes $\phi_1$ to the gates 210.

The third select line is connected to one input of NAND gate 228, to an inverter 229 and to a NAND gate 230.

The fourth to tenth select lines are then connected to OR gates in the match circuit 41 which leads through the NAND gate 213 to the increment one circuit 215.

The eleventh select line is connected to a gate 231 which controls application of $\phi_2$ to gates 232 which lead from the select lines A–K of timer 34.

State time generator 40 is synchronized with the calculator by application of the idle state to terminal 55. This idle state is shifted through $\phi_2$ gate 240 to inverter 241. It is then delayed one state time in passing through $\phi_1$ gate 242 and $\phi_2$ gate 243. It then is applied through a NAND gate 244 to a gate 245 which applies $\phi_1$ to a set of gates 246. The generator 40 is regenerative so that when power is applied it will begin operation but at a random phase relative to the calculator. The first idle state applied to chip 18 will, through application of $\phi_1$ to gates 246, force generator 40 to the zero state following which it is in sync with the state time of calculator 10. Once initiated, generator 40 then repeatedly cycles through 16 states in operations involving section 40b and section 40a. Section 40a has eight input lines 247 and sixteen select lines 248. The select lines are connected through $\phi_1$ gates 249 to section 40b which includes four select lines 250. Lines 250 lead through a set of $\phi_2$ gates 251 to the input lines 247.

The A output from timer 34 is connected to one input of a multi input NAND gate 300 and to one input of a NOR gate 301. NOR gate 301 leads to a logic circuit 302 which provides an output on line 303 which is a strobe output controlling the time interval ROM 32 is to be employed.

The B output of timer 34 is connected to one input of a NAND gate in logic unit 304 which controls the paper drive motor.

The C output of timer 34 is connected to one input of OR gate 41h of match logic 41 and to a second input of NAND gate 300.

Output D is connected to one input of OR gate 41e and to the input of an inverter 305. Inverter 305 is connected through inverter 515 to a gate 306 in the SP command channel, to one input of NAND gate 300, to inverter 38d and to one input of each of four NAND gates to strobe the output of circuit 304 to terminals 71–74.

The E output of generator 34 is connected to one input of OR gate 41d, to one input of NAND gate 300 and to one input of NAND gate 310, the output of which drives one input of NOR gate 301.

The F output of timer 34 is connected to a second input of NAND gate 310, to one input of the logic circuit 304, and to one input of NAND gate 300.

The H output of generator 34 is connected to one input of OR gate 41c.

The J output of generator 34 is connected to one input of OR gate 41f and to one input of the logic network 304.

The K output of generator 34 is connected to the third input of NAND gate 310, to one input of NAND gate 300 and to a fourth input to the logic circuit 304.

Tabble II lists the codes for the select lines from section 34b.

TABLE II

PRINT PROGRAM

| Line | _____ States _____ | | | | | | | | | | | | | | | |
|---|---|---|---|---|---|---|---|---|---|---|---|---|---|---|---|---|
|  | 15 | 14 | 13 | 12 | 11 | 10 | 9 | 8 | 7 | 6 | 5 | 4 | 3 | 2 | 1 | 0 |
| A | 0 | 0 |   |   |   |   |   |   | 0 | 0 | 0 | 0 |   |   | 0 | 1 |
| B |   |   |   |   |   | 1 | 0 | 1 | 1 | 1 | 0 | 0 | 0 | 0 | 0 | 1 |
| C | 0 | 1 |   |   |   | 0 | 0 | 0 |   |   |   |   |   |   | 0 | 1 |
| D | 0 |   |   |   |   |   |   |   |   |   |   |   |   |   | 0 | 1 |
| E |   |   |   |   |   |   | 1 | 1 |   |   |   |   |   |   | 0 | 1 |
| F |   |   |   |   |   | 1 | 1 | 0 | 1 | 0 | 0 | 0 | 0 | 0 | 0 | 1 |
| H |   |   | 1 | 1 | 1 |   |   |   |   |   |   |   |   |   | 0 | 1 |
| J |   |   |   |   |   | 1 | 1 | 1 | 0 | 1 | 0 | 0 | 0 | 0 | 0 | 1 |
| K | 0 |   |   |   |   | 1 | 0 | 1 |   |   |   |   |   |   | 0 | 1 |

Select line A will be at a zero level when the 32 input lines to decoder 34b meet the requirements shown for line A in Table II. Specifically select line A will be a zero when input line B0 is a one level and B1 is a zero level (its complement is a one level), and B4, B5, B6, B7, B14, B15 are all at zero level. The unspecified input lines in Table II have no effect on their corresponding select line, i.e., B's 2, 3, 8, 9, 10, 11, 12, 13 do not affect select line A. The other select lines work in a similar manner.

Table III sets out the print program, indicating the lines that are at zero state at the sample time, i.e., when gate 231 is conductive as controlled by $S_1\phi_2$.

NOR gate 228 feeds line 204 as previously described. Gate 324 feeds line 194 previously described. Line 193 previously described is connected from NAND gate 323 by way of an inverter 323a. The input to NAND gate 323 comprise the output of NAND gate 321 and the outer of inverter 229 which applies the S5–S14 states. Line 203 previously described is supplied by way of NAND gate 325, one input of which is supplied from NAND gate 320 and the other which is supplied by way of inverter 229.

The zero print command ZP is applid through gate 210 and thence through inverter 326 to a gate 327. $\phi_2$ is then applied through gate 327 during the ZP com-

TABLE III

PRINT PROGRAM

| 15 | 14 | 13 | 12 | 11 | 10 | 9 | 8 | 7 | 6 | 5 | 4 | 3 | 2 | 1 | 0 | Zero Lines At $S_1O_2$ Times |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |   |
| 0 | 0 | 0 | 0 | 0 | 0 | 0 | 0 | 0 | 0 | 0 | 0 | 0 | 0 | 0 | 1 | D,A |
|   |   |   |   |   |   |   |   |   |   | 0 | 0 | 0 | 1 | 0 | 1 | D,A |
|   |   |   |   |   |   |   |   |   |   | 0 | 0 | 1 | 0 | 0 | 1 | D,A |
|   |   |   |   |   |   |   |   |   |   | 0 | 0 | 1 | 1 | 0 | 1 | D,A |
| ↓ | ↓ | ↓ | ↓ | ↓ | ↓ | ↓ | ↓ | ↓ | ↓ | 0 | 1 | 0 | 0 | 0 | 1 | D |
|   |   |   |   |   |   |   |   |   |   | 0 | 1 | 0 | 1 | 0 | 1 |   |
| 0 | 0 | 0 | 0 | 0 | 0 | 0 | 1 | 0 | 0 | 0 | 0 | 0 | 0 | 0 | 1 | D,A |
|   |   |   |   |   | 0 | 1 | 0 | 0 | 0 | 0 | 0 | 0 | 0 | 0 | 1 | D,A |
|   |   |   |   |   | 0 | 1 | 1 | 0 | 0 | 0 | 0 | 0 | 0 | 0 | 1 | D,A |
|   |   |   |   |   | 1 | 0 | 0 | 0 | 0 | 0 | 0 | 0 | 0 | 0 | 1 | D,A |
|   |   |   |   |   | 1 | 0 | 1 | 0 | 0 | 0 | 0 | 0 | 0 | 0 | 1 | D,A,K |
|   |   |   |   |   | 1 | 0 | 1 | 1 | 1 | 0 | 0 | 0 | 0 | 0 | 1 | D,B,K |
| ↓ | ↓ |   |   |   | 1 | 1 | 0 | 1 | 0 | 0 | 0 | 0 | 0 | 0 | 1 | D,F,E |
|   |   |   |   |   | 1 | 1 | 1 | 0 | 1 | 0 | 0 | 0 | 0 | 0 | 1 | D,E,J |
| 0 | 0 | 0 | 0 | 1 | 0 | 0 | 0 | 0 | 0 | 0 | 0 | 0 | 0 | 0 | 1 | D,A |
| 0 | 0 | 1 | 1 | 1 | 0 | 0 | 0 | 0 | 0 | 0 | 0 | 0 | 0 | 0 | 1 | D,A,H |
| 0 | 1 | 1 | 0 | 0 | 0 | 0 | 0 | 0 | 0 | 0 | 0 | 0 | 0 | 0 | 1 | D,C |
| 0 | 1 | 1 | 0 | 0 | 1 | 0 | 1 | 0 | 0 | 0 | 0 | 0 | 1 | 0 | 1 | D,K |
|   |   |   |   |   | 1 | 0 | 1 | 1 | 1 |   |   |   |   |   |   | D,K,B |
|   |   |   |   |   | 1 | 1 | 0 | 1 | 0 |   |   |   |   |   |   | D,F,E |
|   |   |   |   |   | 1 | 1 | 1 | 0 | 1 |   |   |   |   |   |   | D,J,E |
| 0 | 1 | 1 | 0 | 0 | 0 | 0 | 0 | 0 | 0 | 0 | 0 | 0 | 0 | 0 | 1 | D,C |
| 0 | 1 | 1 | 0 | 1 | 1 | 0 | 1 | 0 | 0 | 0 | 0 | 0 | 1 | 0 | 1 |   |
|   |   |   |   |   | 1 | 0 | 1 | 1 | 1 |   |   |   |   |   |   |   |
|   |   |   |   |   | 1 | 1 | 0 | 1 | 0 |   |   |   |   |   |   |   |
|   |   |   |   |   | 1 | 1 | 1 | 0 | 1 |   |   |   |   |   |   |   |
| ↓ | ↓ | ↓ | ↓ | ↓ |   |   |   |   |   |   |   |   |   |   |   |   |
| 0 | 1 | 1 | 1 | 1 | 0 | 0 | 0 | 0 | 0 | 0 | 0 | 0 | 0 |   |   | D,H,C |
| 1 | 0 | 1 | 0 | 0 | 1 | 0 | 1 | 0 | 0 | 0 | 0 | 0 | 0 | 0 | 1 | END |

The CP command is applied through gate 210 to one input of each of NOR gate, 230, NAND gate 320 and NAND gate 321. The second input to NAND gate 320 is the SP command which is applied from gate 210 through inverter 322 and NAND gate 306. This also supplies a second input to NAND gate 321.

The FP command passes through gates 210 and is a third input to NAND gate 321 and a second input to NOR gate 228.

The commands PP and ZP applied through gate 210 are applied to NAND gate 324.

mand to inputs of the load logic for SAM 31 so that upon the command ZP all of the data stored in SAM 31 is effectively erased and SAM 31 is cleared and available for a succeeding instruction cycle.

The output of inverter 326 is also connected as a second input to NAND gate 324.

Upon command FP, power is applied to circuit 328 leading to the array 30 to clock loads 114 and 115. Array 30 is used only when function commands are to be executed. On operations other than function commands, the data from register 110 is merely read out through gates 170 for loading into SAM 31. Thus, the circuit 328 serves to economize on the use of power in operation of the chip 18.

In array 30, when a function command is received, then the upper section of the array 30 is employed during three successive states to read out three desired characters from the array 30 into SAM 31, thereby permitting the loading of three characters into SAM 31 for a single instruction cycle.

This is accomplished through the use of a sequential selector 330. Selector 330 comprises three NAND gates 331–333. The output of gate 331 leads to a set of output gates 334. NAND gate 332 leads to gates 335. The output of gate 333 leads to gates 336. The second input to NAND 331 is supplied with the pointer signal as it appears at the output of an inverter 337. The output of inverter 187 goes to zero to signify the presence of the pointer. The inverter pointer pulse when is applied to NAND gate 331 along with the signal FP(S5–S14) which also is a positive going signal. Thus, when the gate 331 is enabled, the bank of gates 334 is rendered conductive to transfer into SAM 31 the first of the three function characters to be loaded. The pointer also is applied to a delay network 338 so that during the next succeeding state time, the output of NAND gate 332 is enabled to render conductive the gates 335 to load the second symbol. The output of the first stage of the delay network 338 is connected through a further delay and thence to NAND gate 333 which when enabled, renders gate 336 conductive to load the third symbol into the SAM 31.

An OR gate 340 applies the two delayed pointer states to the second input of NAND gate 186 through NAND gate 341, thereby to force the load control states on lines 173, 174, 175 and 176 to remaian unchanged for the three states during which the three function symbols are loaded into SAM 31.

It will be recognized that a function symbol may comprise only a plus sign or a minus sign, and thus would involve loading only one actual symbol. In such case, two blanks are loaded during the function command.

COLUMN ENABLE

The B8–B11 state lines from the array 34b of generator 34 are connected through gates 34c to decoder 39. The outputs of decoder 39 lead by way of gates 39a to the output terminals 61–65. Gates 39a conduct in response to an ENABLE signal on a line 38f. Line 38f leads from NAND gate 300 by way of an inverter 501. ENABLE line 38f also is connected to gates 38g to apply the contents of shift register 38 to the output terminals 81–100.

A strobe line 303 from circuit 302 is connected by way of a $\phi_1$ gate 502 to a gate 503. The source for gate 503 is $\phi_2$ and the output line 504 from gate 503 is connected to the input gates 38a of shift register 38. The state lines B8–B14 at the output of gates 34c are connected to lines 162, 163 by way of a bank of programmable contacts 505.

It will be recalled that lines 162 are decoded in decoder 161 to provide a one of five selection. Lines 163 are decoded to provide a one of seven selection. The programmable contacts 505 permit the use of lines B8–B10 to supply lines 162 and lines B11–B13 to supply lines 163. However, if it is desired that the burn time be increased to twice a normal burn time (of about 5 milliseconds), then lines B9–B11 would supply lines 162 and lines B12–B14 would supply lines 163.

Contacts 505 are selectable when chip 18 is manufactured and may not be thereafter changed. Design flexibility is afforded in establishing the burn time.

In a similar sense, the instruction register decoder 48 is programmable so that it can accommodate (a) a single stream of thirteen bit instruction words, or (b) may accommodate two streams, one of seven bits and the other of six bits. This is accomplished by making gates 510 and 511 in the set of the $\phi_1$ gates 512 programmable. When chip 18 is built with gate 510 present, the unit will accommodate the thirteen bit instruction word through terminal IRG. If gate 510 is not included and gate 511 is present, then the register will accommodate simultaneous seven and six bit streams through terminals IRGB and IRGA, respectively, to form a single thirteen bit instruction word.

It will be recalled that flip-flop 206 serves to enable a line 206a during the read out of the first half of the SAM 21 and then changes state so that line 206b is enabled during the read out of the second half of SAM 31. This is accomplished by employing the output on line 143 from the commutator 139. The absence of a contact at the juncture 143a applies a gate pulse to the gate 143b, thereby to apply a switching pulse to the flip-flop 206. This occurs two state times before the end of the read out of the first half of SAM 31. However, because of the delays introduced by gate 143b, the $\phi_1$ gate 206c, the $\phi_2$ gate 206d and the $\phi_1$ gate 206e, the states on the control line for switches 137a and 137b are changed coincident with the end of the reading of the first half of SAM 31.

RESET

The SP command at the output of NAND gate 306 serves to reset the latch 302a in circuit 302 by way of a gate 302b. It also resets timing generator 34 by application of a pluse to one input of NAND gate 216. It also resets control logic 304 for the stepping motor.

The ZP and PP commands, applied by way of line 194 through inverter 195 and gate 199, reset the latch 198 in the load sequence unit. The output of inverter 195 is also applied by way of gate 340 to reset the read out flip-flop 206 so that when data is to be read out of SAM 31, it will begin reading out from the first half thereof.

From the foregoing, it will be seen that the chip 18 provides its own programming independent of calculator 10 once it receives a PP command. The PP command initiates operation of the timing generator 34 which then creates the necessary timing functions on the output lines A–F, H, J and K as gated out at time $S_1\phi_2$ through gates 232.

FUNCTION PRINT

Table IV shows an example list of character groups that may be printed by programming the decode section of array 30.

TABLE IV

Functions programmed on function decode array 30

| Function | Code |
|---|---|
| FV | |
| = | |
| − | |
| + | |
| ÷ | |
| × | |
| ROOT | |
| PWR | |

TABLE IV-continued
Functions programmed on function decode array 30

```
LOG
SQR
1/x
Δ%
STD
VAR
SQT
X!                      Symbol      Code
Σ+                       ⎧ L       010111
EXP                      ⎨ N       011001
LNX     1010100          ⎩ X       100100
%           j
COS
SIN     1010111          ⎧ S       011110
TAN                      ⎨ I       010100
MEAN                     ⎩ N       011001
IOX
π
XCH
DAY
DATE
STO
RCL
π
λ
INT
PMT
η
PV
CLR
```

The selection of codes for the function to be performed are dependent upon the operation of the keyboard in calculator 10. Representative codes for two of the functions, LNX and SIN are included in Table IV. The codes thus adopted for these two functions are programmed in array 30 on lines 513 and 514. More particularly, the function LNX (indicating logarithm of X) is programmed on line 513. The function SIN is programmed on line 514. The system is to operate such that when the LNX code is clocked from register 110 into array 30, the line 513 will go low. The output lines 113 are then selectively connected through a plurality of contacts to line 513 so that the three letters X, N and L will be read into SAM 31 when gates 334, 335 and 336 sequentially are enabled.

Table IV also includes the codes for the letters L, N, X, S and I. The codes of Table II can readily be checked against the location of contacts on line 513.

The function code for SIN is programmed by providing contacts connecting between the input lines 111 and the select line 514 in the lower portion of array 30. The letters SIN are then programmed by connecting contacts to the select lines 113 in the upper section of array 30.

In the embodiment of the invention herein described, the motor to which contacts 71-74 were connected was a conventional four phase motor, typically as manufactured and sold by North American Philips Control Corporation of Chesire, Conn. and identified as part No. B82203-M4.

The printhead to which terminals 61-65 and 81-100 connect was of the type manufactured and sold by Texas Instruments Incorporated of Dallas, Texas and identified as part No EPN-3100.

Depicted in FIG. 13a is another aspect of this invention showing a more detailed functional interrelationship between the ROM 32 and its address circuitry. As earlier stated, ROM 32 is a 64 × 34 matrix, and may be either of the virtual ground or conventional grounded type. A conventionally grounded configuration is depicted in FIG. 13b. According to one aspect of this invention the ROM 32 is partitioned into a plurality of A × B memory cells. The plurality is here chosen to be 64 in number, but any suitable number may be utilized according to ROM size. The size of each partition is here chosed to be 7 × 5 for suitably accommodating alphanumeric characters, but any other suitable A × B partition size may be utilized.

A six-bit address is communicated via lines 103 to decoder 160. Decoder 160 is a one out of 64 select for selecting and energizing only the partition corresponding to the six-bit address. Decoder 161 is responsive to first and second three-bit addresses on lines 162 and 163 respectively for scanning the selected partition. It is understood that the one out of five column address section of decoder 161 and the one out of seven row address section of decoder 161 is chosen so as to accommodate the particular partition array size.

As has hereinbefore been described, the six-bit address sequentially selects a plurality of N characters with decoder 161 sequentially strobing the selected partitions. For example, if a 20 character line is desired (N=20), then decoder 161 will address the 1 — 1 (row - column) cell of each of the N selected partition groups. Then decoder 161 will address the 1 - 2 cell in each of the 20 partitions, etc. Not shown, but explained earlier, is the output from the ROM 32 wherein the output from each selected partition group is serially combined with the output from the previous group. The output are then stored in register 38 for actuation of the thermal printer.

Shown in FIG. 13b is a conventional 5 × 7 partition group in a non-virtual ground ROM configuration. Output lines 37a–37a'''' are respectively and serially output in combination with outputs 37a–37a'''' from the other chosen partition groupings. Decoder 160 selects the particular partition grouping via line 160' for rendering conductive gating element 160a which selectively couples $V_{SS}$ to the partition grouping.

What is claimed is:

1. A semiconductor printer system for a thermal line printer where a plurality of heaters are provided in a linear array arranged in groups, each said group having a first number of heaters and like-positioned heaters in each of said groups having one side thereof electrically connected in common, and where a motor is provided for stepping a second number of times thermally sensitive paper past said linear array during the printing of a line of characters, said system comprising:

a. storage means to store a set of a multibit words, one word for each character to be printed on a given line;

b. commutator means to read cyclically said set of words from said storage means at least a third number of times for each line of characters to be printed, said third number being equal to the product of said first and second numbers;

c. a random access ROM having therein a dot matrix code for each different character;

d. a time sequencer and decoder connected to said ROM and synchronized with said commutator to produce a different one bit output from said ROM each time one of said words is read from said ROM;

e. a set of first enable circuits, each first enable circuit leading from said ROM to one of the groups of said heaters;

f. a set of second enable circuits, each second enable circuit leading from said time sequencer to one of said like-positioned heaters in each of said groups; and g. decoder means interfacing said time sequencer to said like-positioned heaters and to said motor to enable said heaters, one heater per group for each said set of words read from said storage means, like-positioned heaters being simultaneously energizable, and to step said motor after said set of words has been read from said storage means said first number of times.

2. The combination set forth in claim 1 wherein said first number is the number 5, wherein said second number is the number 7 and wherein each of said characters is formed within the bounds of a 5 × 7 dot matrix.

3. In a semiconductor printer system for a thermal line printer where a plurality of heaters in a linear array having a number "N" groups, each said group having a number "A" heaters, are to energized by first enable circuits leading to said N groups of heaters and by second enable circuits, leading to said N groups of heaters and by second enable circuits, each said second enable circuit leading to a different heater in each said group where each heater in each said group is from a corresponding position in the respective groups, and a motor for stepping thermally sensitive paper past said linear array, said motor being stepped a number "B" times in printing a line of N characters, the combination which comprises:

a. a memory to store a set of N multibit words, one word for each character to be printed on said line;
b. read control means cyclically to read said set of words from said memory at least a number of times for printing said line, said number being the product of A and B; and
c. read only memory means synchronized with said read control means for producing a one bit output each time each word is read from said memory and sequentially to enable said heaters, one heater from each group being simultaneously energizable during each time said set of N multibit words is read from said memory and to step said motor following each read of A sets of N multibit words from said memory.

4. A printer system for a multi-element printer of data, said elements being arranged in N groups, each of said groups having A elements, said system comprising:

a. storage means to receive and store a serial bit data train coded to represent up to N alphanumeric characters to be printed on a line;
b. a permanent store memory connected to said storage means in which there is stored a binary mask representing a repertoire of said characters in an A × B matrix format code;
c. generator means to generate timing signals synchronized with said data train;
d. means to read outputs from said storage means and to output timing signals from said generator to said permanent store memory for generating sets of N output states;
e. means to store each said set of output states in the order of generation thereof; and
f. means responsive to each said stored set of output states to simultaneously energize elements of said printer corresponding to a particular state in each said stored set of output states.

5. A semiconductor printer control system for printing, by a thermal printhead having a linear array of heaters arranged in N groups of A like-positioned heaters per group in combination with a stepping motor which is stepped B times when printing a line having up to N alphanumeric characters represented by a set of multibit words, which comprises:

a. storage means for receiving and storing the set of multibit words;
b. commutator and read-only-memory means responsive to a print command for reading the set of words stored in said storage means at least a number of times equal to the product of A and B and to transform the same into a serial bit stream corresponding to a dot matrix code for each word, the bit stream corresponding to a different selected bit of each said dot matrix code during successive readings of the set of wods;
c. timer means for enabling simultaneously the likepositioned heaters according to the serial bit stream;
d. means for selectively enabling non-like-positioned heaters according to successive serial bit streams; and
e. means for stepping said motor to move thermally sensitive paper relative to said printhead after all non-like-positioned heaters in the groups have been enabled according to said serial bit stream.

6. Apparatus to output an N character line of alphanumeric characters to a linear array of elements arranged in N groups of a number of elements per group in an output station which comprises:

a. means to store a serial bit stream of data words representing successive characters in a line of N alphanumeric characters of a character repertoire;
b. means to transform said words into a plurality of sets of dot matrix codes representing said N characters; and
c. timing and decode means to address said station with said plurality of sets and to selectively energize the elements of said groups each time the output station is addressed.

7. A semiconductor printer calculator system for printing a line of N characters which receives sync and timing pulses and independently generates a control program for a thermal printer upon receipt of a calculator instruction and calculator data to be printed, which comprises:

a. an instruction register to receive the command instruction;
b. instruction decoder connected to said instruction register to decipher the control program to be generated;
c. a programmed logic array to receive said date and to provide encoded function characters for print out when a function command is to be executed;
d. a sequential selector connected to said programmed logic array which employs said array during successive states corresponding to the number of characters in a function command to be executed;
e. a state time generator responsive to said sync and timing pulses to synchronize the print operation with external operation of said calculator;
f. an internal timing generator connected to said state time generator to generate timing signals to control said printer;
g. a sequential access memory which stores N multibit words from said programmed logic array corresponding to the N characters to be printed;

h. a free running commutator means connected to said sequential access memory, to said state time generator, to said timing generator and to said instruction decoder to control the storing of multibit words from said programmed logic array into said memory and to control the cyclical reading of said words from said memory;

i. a read-only-memory which stores a dot matrix codes corresponding to each character that may be printed;

j. a decoder connected to said read-only-memory and synchronized with said commutator to produce a serial binary code including one bit corresponding to one dot of each character to be printed;

k. an output register to store N bit binary code from said read-only-memory, each bit of which corresponds to the location of one dot of each character to be printed; and l. means for energizing said thermal printer in response to said output register contents.

8. The combination as set forth in claim 7 wherein two decoders are connected to said read-only-memory, one which decodes the multibit word from said sequential access memory to decipher which character is to be printed, and one which decodes pulses from said timing generator to decipher the location of the dots representing the characters to be printed.

9. The combination as set forth in claim 7 wherein:
a. said read-only-memory is a random access, virtual ground memory; and
b. said sequential access memory includes a plurality of commutated registers and a pointer register.

10. The combination as set forth in claim 9 wherein:
a. said read-only-memory stores an A × B dot matrix code for each possible character to be printed, where A represents the number of dots per column per character and B represents the number of dots per row per character;
b. said commutator means cyclically reads words from said sequential access memory A × B times for each character to be printed; and
c. said sequential selector under a function command employs said programmed logic array to permit the loading of all function characters into said sequential access memory in a single instruction cycle.

* * * * *